United States Patent [19]

Hamilton

[11] Patent Number: 4,815,757
[45] Date of Patent: Mar. 28, 1989

[54] RAPID DEVELOPMENT SURVEILLANCE VEHICLE AND METHOD

[76] Inventor: Mark L. Hamilton, 5154 Camino Del Norte, Sierra Vista, Ariz. 85635

[21] Appl. No.: 855,834

[22] Filed: Apr. 24, 1986

[51] Int. Cl.⁴ ............................................. B60S 9/10
[52] U.S. Cl. .................................... 280/764.1; 49/68; 49/142; 49/356; 52/118; 182/63; 212/187; 248/179; 248/183; 280/6.1; 358/108
[58] Field of Search ............ 280/6 R, 6 H, 6.1, 764.1; 352/132; 354/81; 358/108; 52/115, 116, 118; 212/183, 185, 186, 187; 248/179, 183; 49/142, 68, 356; 242/107.1; 292/79, 78, 18; 296/46, 216, 219, 223, 224; 182/63, 127

[56] References Cited

U.S. PATENT DOCUMENTS

| | | | |
|---|---|---|---|
| 1,276,825 | 8/1918 | Swope | 242/107.1 |
| 2,719,471 | 10/1955 | Aspden et al. | 352/132 |
| 2,854,252 | 9/1958 | McLerran | 280/6 R |
| 3,523,698 | 8/1970 | Bishop | 280/766.1 |
| 4,512,589 | 4/1985 | Ambrose et al. | 280/6 R |
| 4,593,474 | 6/1986 | Mayhew | 280/764.1 |
| 4,597,584 | 7/1986 | Hanser | 280/6 R |

FOREIGN PATENT DOCUMENTS

| | | | |
|---|---|---|---|
| 3317003 | 11/1984 | Fed. Rep. of Germany | 358/108 |
| 752658 | 7/1933 | France | 352/132 |
| 1546575 | 10/1968 | France | 52/118 |
| 124268 | 3/1919 | United Kingdom | 52/118 |
| 478803 | 1/1938 | United Kingdom | 242/107.1 |

Primary Examiner—David M. Mitchell
Assistant Examiner—Eric D. Culbreth
Attorney, Agent, or Firm—Cort Flint

[57] ABSTRACT

A rapid deployment surveillance vehicle is disclosed for detecting illegal immigration across national borders and the like. An off-the-road vehicle (V) is equipped with a rapid mast erection/retraction assembly (A) which includes a carriage mechanism (24) which carries a telescoping mast (12). A track mechanism (20) slidably carries the carriage mechanism (24) by means of a fixed support (22) and pivoting support arms (26). Ram air cylinders (52, 54, 56) move the carriage mechanism in translational and rotational movement as guided on the track mechanism in a manner that the mast (12) is moved from a stowed horizontal position to an erect vertical position. During erection of mast (12), a longitudinal roof opening (10) is opened by means of a main door (14) and displacement door (16) in an automatic manner. Once erect, a leveling system (B) checks to ensure that the vehicle is within one degree of level. Both level sensors (182) and pressure sensors (148) ensure that the vehicle is level and that all four jack legs (150) are firmly engaged against the ground prior to extension of mast (12). Once the vehicle is within the prescribed level conditions, mast (12) is pneumatically extended to a height of thirty feet whereupon a detection device (28) which may be in the form of an infrared camera is ready for surveillance. Camera (28) is mounted on a pan/tilt device (30) which rotates it in a horizontal plane and tilts it in a vertical plane for increased surveillance. Wiht the mast within one degree of true vertical, a stable platform is provided for camera (28) so that a nondistorted image appears on the display of a monitor (27) remote from the camera.

31 Claims, 17 Drawing Sheets

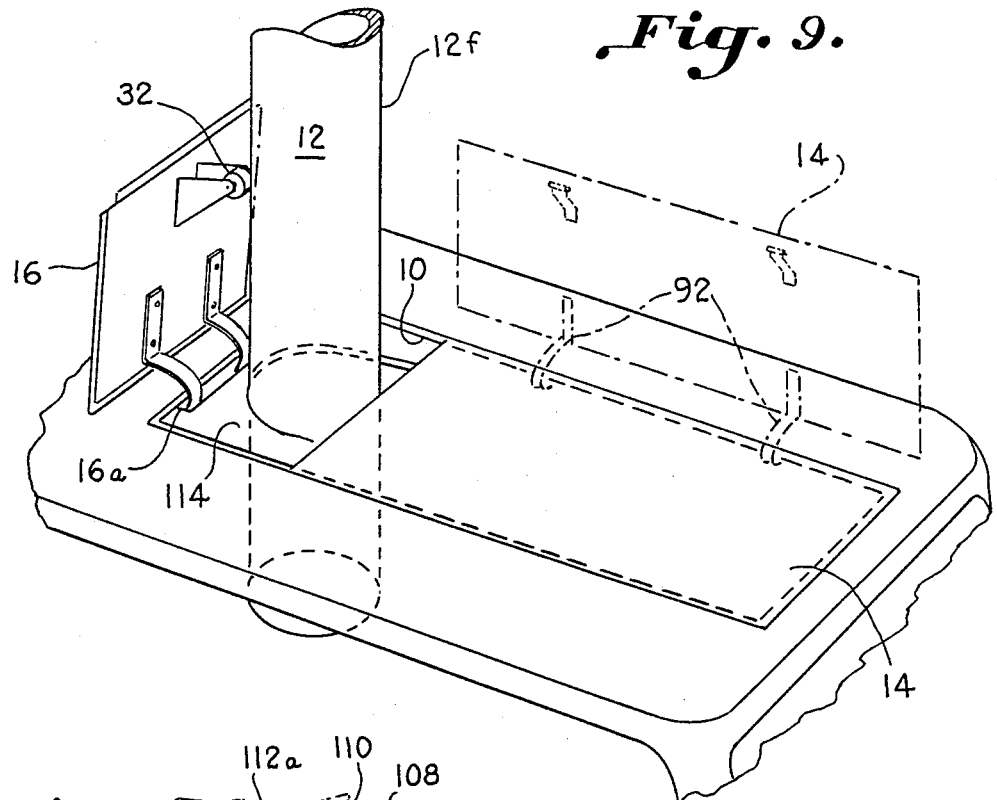
Fig. 9.
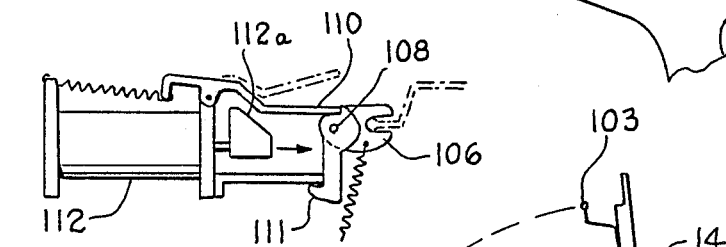
Fig. 10-A.
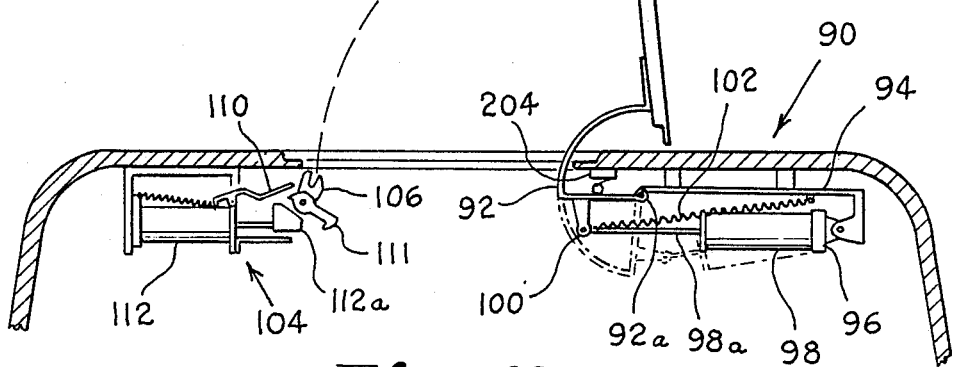
Fig. 10.

RAPID DEVELOPMENT SURVEILLANCE VEHICLE AND METHOD

BACKGROUND OF THE INVENTION

The invention relates to the detection and surveillance of persons and vehicles, particularly to those persons engaged in illegal activities such as illegal immigration and drug smuggling across national borders. The invention is very advantageous to the surveillance and detection of persons during night time or under desert conditions when the person may be a long distance away and behind brush or other camouflage material. The invention is directed to detecting devices which can detect the presence of a person, such as by heat sensing using infrared camera devices, as long as the mass of the person is greater than the object he is hiding behind. The problem of detecting illegal immigrants and drug smugglers across the national borders has become particularly severe during recent years.

Heretofore, the United States Border Patrol has used tripod mounted surveillance devices such as infrared cameras to detect illegal immigrants and drug smugglers across the borders. However, these tripod mounted surveillance devices surveil in only a given direction and lack mobility. If the person was not taking the route under surveillance, then it is unlikely that the person would be detected. The Border Patrol agent may also be subjected to harsh outside elements while looking through the surveillance device. The length of time that a patrol agent can visibly look through a device is limited without severe eye strain or disfocusing. Extreme temperature conditions and other environmental conditions can exist in the extreme northern most and southern most borders of the United States.

Persons illegally crossing the borders typically use culverts, gullies, heavily brushed areas, and low lying areas to cover them from surveillance. Groups of illegal immigrants are typically brought across the border by a hired guide typically referred to as a "coyote." The "coyote" will often get away when the group is caught and hide somewhere in the surrounding area for escape. The "coyote" often dresses in black and other camouflaged dress which makes it extremely difficult to find him, particularly at night. He can be within a range of fifty to one hundred feet, or even within a few feet of the Border Patrol agent, and not be detected in the dark night of the desert.

In the year 1985, it has been officially estimated that over three million illegal immigrants have crossed the borders of the United States. With the increased law enforcement against drug trafficking occurring at the port areas, increased drug smuggling is occurring across the borders. The step-up of terrorist activities in recent months also has created a need for increased surveillance of illegal persons crossing the national borders.

The traffic of illegal weapons has been on the increase as has border related crime. In general, countries are becoming increasingly conscious of persons crossing their national borders for illegal purposes.

Accordingly, an object of the invention is to provide an effective mobile surveillance system and method for detecting persons illegally crossing the national borders.

Another object is to provide a normal appearing vehicle in which a surveillance system can be concealed and rapidly deployed for detecting persons crossing the national borders for illegal purposes.

Another object of the invention is to provide a surveillance device and method which may be rapidly erected from a concealed configuration in a normal appearing vehicle to a position in which an extended line of sight is provided for the detection device.

Another object of the invention is to provide a surveillance system which can be rapidly erected from a concealed configuration in a vehicle, and rapidly extended to a vertical height of twenty feet or more.

Another object of the invention is to provide a surveillance device which may be rapidly erected from a concealed configuration in a vehicle and extended on a mast to heights of twenty feet or more, and provided with a stable platform so that no wind vibrations are produced which might interfere with a clear image being produced on the display of a remote monitor.

Still another object of the invention is to provide a surveillance system which may be carried in a stowed, concealed configuration and rapidly deployed so that the vehicle may have the appearance of a regular off-the-road vehicle.

Another object of the invention is to provide a rapid deployment surveillance system which may be stowed in a configuration in a conventional vehicle so that the security of an expensive detection device may be effectively maintained in the vehicle to protect against theft or damage.

SUMMARY OF THE INVENTION

The above objectives are accomplished according to the present invention by providing a surveillance system built into a typical off-the-road vehicle. The surveillance system includes a telescoping mast and an erection/retraction assembly for rapidly erecting the mast from a horizontal, concealed configuration to a vertical position. In the vertical position, the telescoping mast may be extended to a desired height. Atop the telescoping mast is affixed a tilt and rotational mechanism on which a payload such as an infrared camera may be affixed. The erection/retraction assembly is compact and will retract and erect the nested telescoping mast with the payload affixed within an interior space of the vehicle. A leveling system is provided for maintaining the vehicle level when the mast is extended considerably above the vehicle to heights of thirty feet. The leveling system will maintain a desired vehicle level condition such as one degree off vertical. This provides a stable platform for the infrared camera affixed to the telescoping mast extended upwards to thirty feet. The stabilized platform provided by the automatic leveling system enables the infrared camera or other detection device to operate at its maximum imaging capability in a highly efficient manner. The image from the camera is transmitted to a monitor and a very clear, stable image is displayed on the monitor for maximum detection efficiency. With the mast fully extended, the infrared camera has a surveillance range of from a few feet to three miles. Vehicles can be detected anywhere up to fifteen miles. Moreover, the tilting mechanism of the camera enables the elevation of the camera to be adjusted so that vertical scanning may be had. The vehicle itself may be hidden behind a rock formation or treeline, and the detection device extended above the obstacle. In this manner, the vehicle itself may be hidden from detection. In many instances, the persons involved in the activity being surveilled often use counterdetection equipment. By using the system in this manner, its detection is prevented while it is being utilized to detect the activity. The extended elevation range of the detection device provides for increased detection of persons in lowlying areas and for looking over obstacles.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 9 is a perspective view illustrating a main door and displacement door assembly for a roof opening according to the invention;

FIG. 10 is a sectional view of a main top door assembly;

FIG. 10A is an elevational view illustrating a door lock mechanism in accordance with the invention;

DESCRIPTION OF A PREFERRED EMBODIMENT

Figure 1:
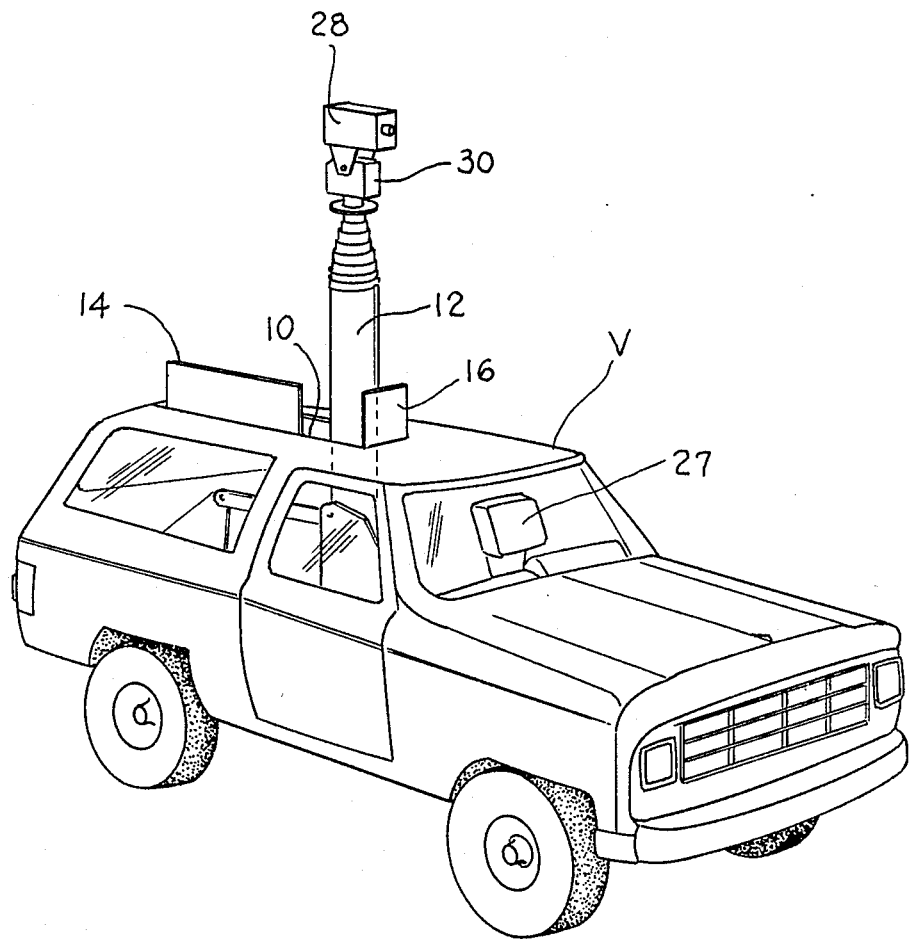
FIG. 1 is a perspective view illustrating an off-the-road vehicle incorporating a rapid deployment surveillance vehicle in accordance with the present invention.

Referring now in more detail to the drawings, FIG. 1 illustrates a four-wheel-drive vehicle commonly referred to as an off-the-road vehicle incorporating a rapid deployment surveillance system for detecting passage of illegal persons and vehicles across national borders in accordance with the present invention. The vehicle designated V has an opening 10 formed in the roof through which a telescoping mast 12 extends. There is a side pivoting main door 14 and a top displacement door 16 which closes the opening 10. The vehicle has the appearance of a regular off-the-road vehicle.

Figure 2:
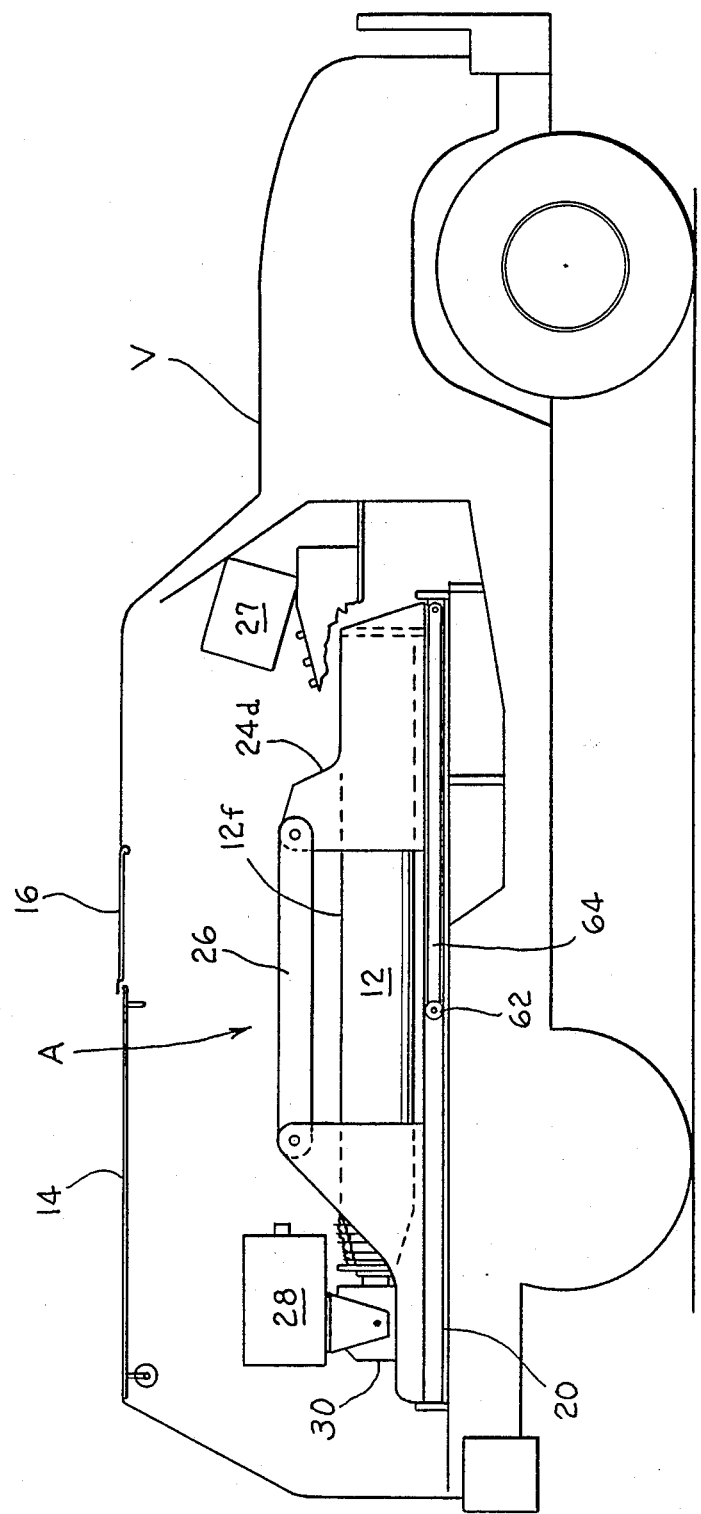
FIG. 2 is a side cut-away view of a vehicle with a rapid deployment surveillance system according to the invention in a stowed concealed configuration.

Referring to FIG. 2, the surveillance system is illustrated in a stowed configuration in which it is concealed and secured from theft or damage. In this configuration the vehicle V takes on the appearance of an average off-the-road vehicle; thus, the vehicle may be driven in a normal manner and may be driven to a sight where surveillance is desired without warning to those under surveillance. The surveillance system is provided with a compact, highly advantageous, rapid deployment and retraction assembly designated generally as A. The assembly A includes a track mechanism 20 upon which a support mechanism 22 is affixed. There is a carriage mechanism 24 which slides and rotates relative to track mechanism 20. There is a support arm 26 pivotally connected between support mechanism 22 and carriage mechanism 24. Mast 12 is carried by carriage mechanism 24 from the horizontal stowed position to the vertical erect position. Mast 12 includes base sections 12f affixed to carriage mechanism 24 at a base 24a and side plate 24b such as by welding.

The telescoping mast 12 is shown in a stowed, nested configuration with a detecting device 28 affixed to the end thereof.

Detecting device 28 may be any conventional sensor or detecting device such as an infrared camera, low-light camera, standard television camera, listening device, laser range-finder, etc., as well as a combination of these devices.

Preferably, detection device 28 is an infrared camera such as manufactured by Texas Instruments Company of Dallas, Tex. as model AN-TAS-A6A. The infrared camera 28 is pivotally attached at 28a to a pan/tilt device 30. Pan/tilt device 30 may be any conventional device for tilting camera 28 as well as rotating camera 28 three hundred and sixty degrees about the longitudinal axis of mast 12. A suitable pan/tilt device is manufactured by Quikset Company of Illinois. The pan/tilt device 30 is affixed to the end of the last leg 12a of the mast 12 in any suitable manner such as by welding a platform 30a onto a pin received in leg 12a. The mast 12 may be any suitable telescoping mast which is pneumatically operated. One suitable mast is manufactured by Will-Burt Manufacturing of Orrville, Ohio as Model TMD-642. The mast includes six telescoping legs and will extend to a height of thirty feet. In the stowed, retracted configuration the mast has a height of approximately six feet.

Thus, it is necessary to provide a highly compact erection/retraction of the six-foot mast from the stowed position to the erect position since the height of the interior space within the cab of the vehicle is considerably less.

Figure 3:
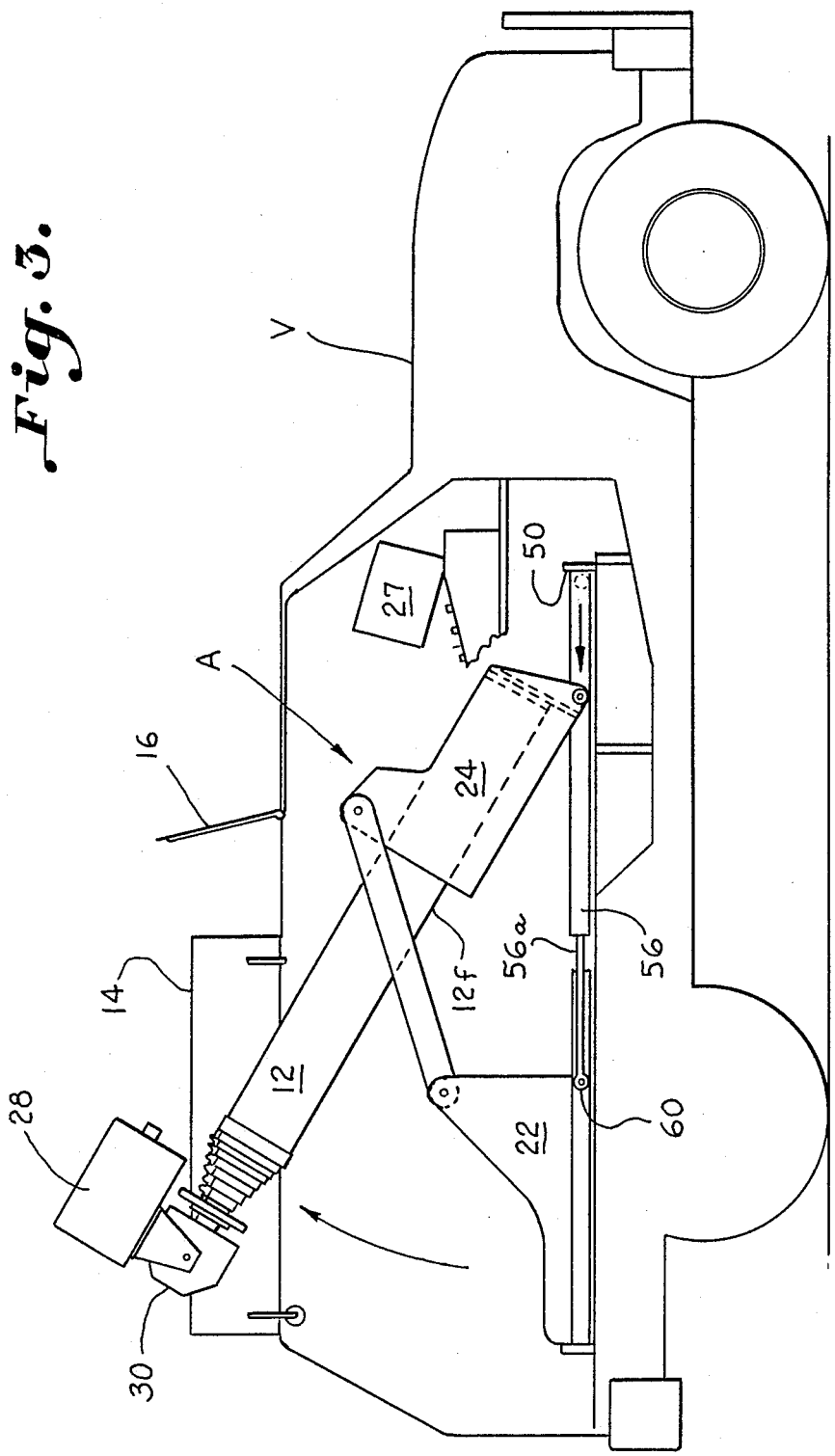
FIG. 3 is a side elevation of a vehicle with parts cut away illustrating the rapid deployment surveillance system in a partially erected configuration.

Referring to FIG. 3, the rapid erection assembly A is illustrated in about a forty-five degree position wherein carriage plate 24 has begun to pivot and rotate upwardly and to slide to the rear of the vehicle. The movement of the rapid erection assembly A is actuated by ram air cylinders which will be described in more detail hereinafter.

Figure 4:
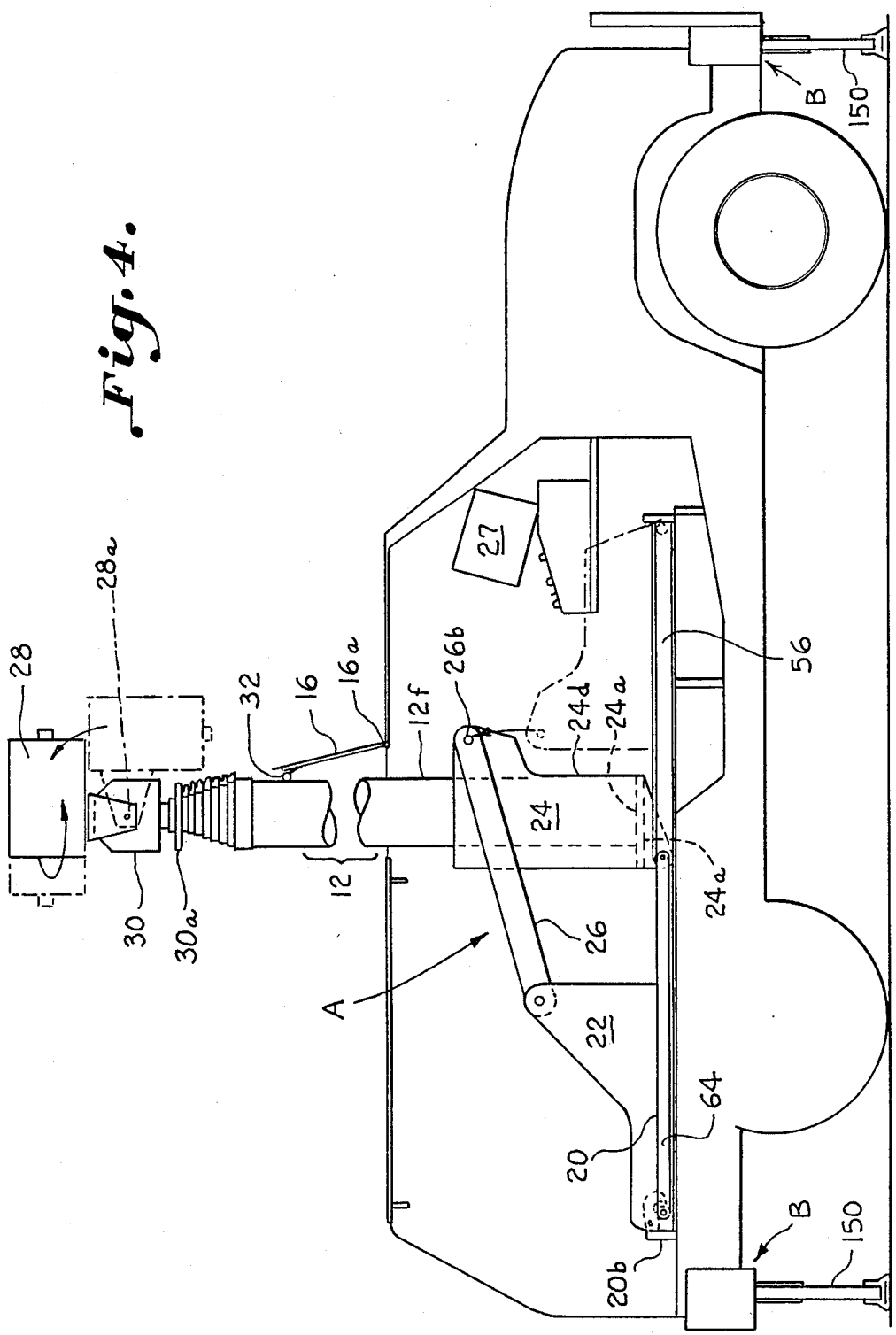
FIG. 4 is a side cut-away elevation of a vehicle employing a rapid deployment surveillance system with a detection device in an erect configuration.

Prior to beginning of the erection movement of the surveillance system, main door 14 may be automatically opened by air actuation in a manner to be more fully hereinafter described. With main door 14 open, mast 12 begins its travel to a fully erect position, as can best be seen in FIG. 4, manually opening displacement door 16. After reaching this fully erect position, main door 14 will close to seal the interior of the vehicle against the outside elements. Displacement door 16 is hinged at 16a and there is a roller at 32 which is engaged by mast 12 to pivot displacement door 16 to the open position as seen in FIG. 4. Displacement door 16 may be spring loaded so that it automatically closes when the mast retracts. It can be seen that carriage plate 24 is pivoted and rotated to an upright position ninety degrees from that as shown in the stowed position of FIG. 2. Likewise, support arm 26 has pivoted about 26a and 26b to allow the movement of carriage plate 24. Carriage plate 24 has moved from the front end 20a of track mechanism 20 to an approximate mid-point thereof.

Mast 12 is affixed to a base plate 24a affixed to the carriage assembly 24 and is likewise affixed to a plate 24b carried between opposing sides of carriage 24. In this manner, mast 12 is affixed to carriage mechanism 24 and moves therewith from the stowed position in FIG. 2 to the erected position in FIG. 4.

Figure 5:
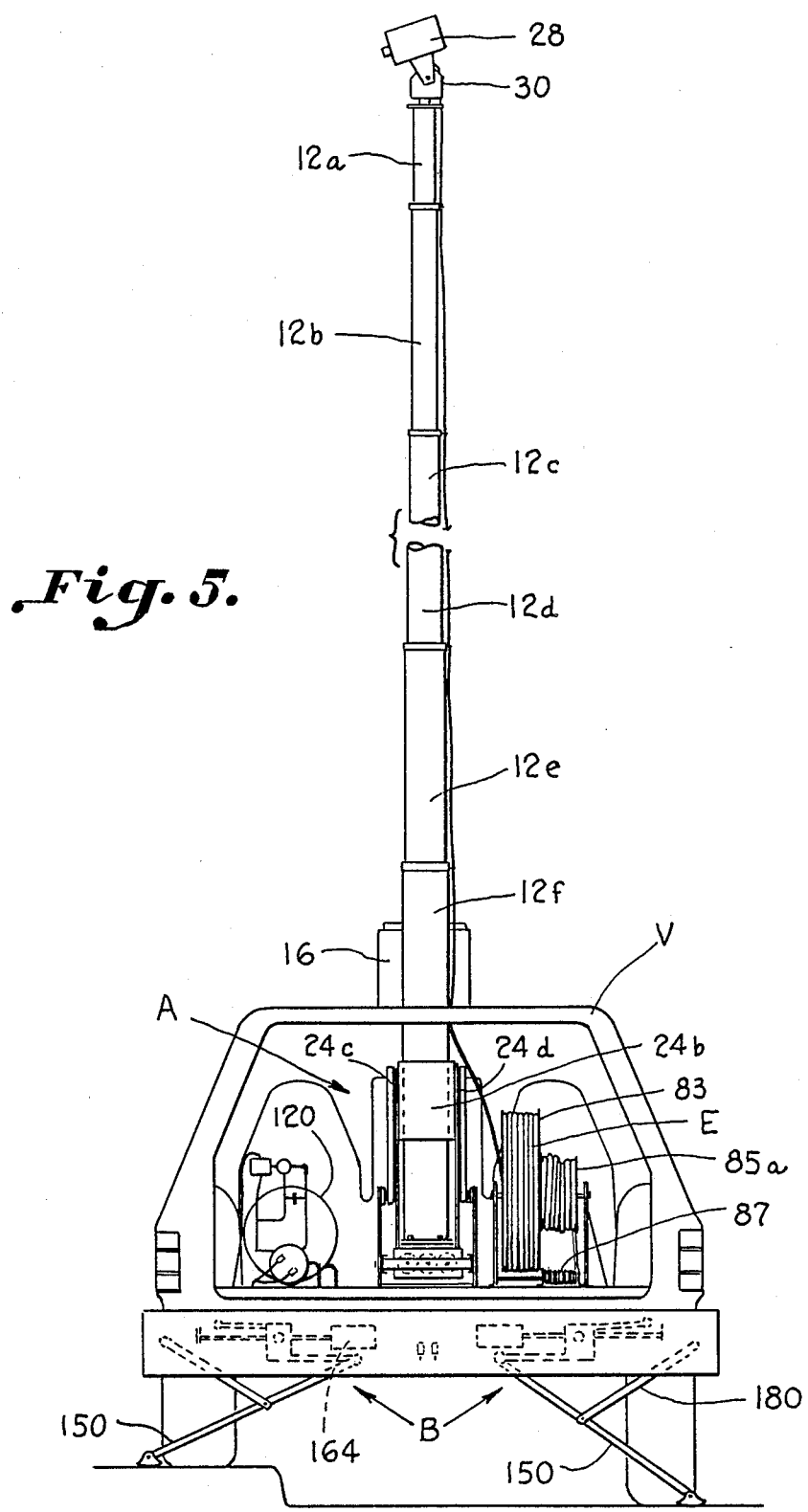
FIG. 5 is an end view of an off-the-road vehicle employing a rapid deployment surveillance system in a fully erect and extended configuration.

FIG. 5 illustrates mast 12 in its fully extended position extended through displacement door 16 to approximately thirty feet. As can be seen, mast 12 comprises legs (12a through 12f). Infrared camera 28 is pivoted for three hundred sixty degree rotational movements, and also for one hundred and eighty degrees of vertical movement about a pitch axis for adjusting the elevation of the camera. This enables the range of the camera to be adjusted and extended, and also allows the camera to view over obstacles. The maximum range would be, of course, in the horizontal position, and the range of the camera would decrease as it is tilted downward. It has been found that the camera so mounted has a range of approximately twenty feet to three miles for detecting a person. The surveillance system has been found to detect a vehicle up to fifteen miles. The infrared camera is particularly advantageous as it senses heat and can detect the body of a person compared to the normal coverage that a person may hide behind in desert environments, as is found around a large amount of the Southern United States border. The infrared camera will detect the body of a person as long as the mass of that person is larger than the coverage. The high extension and elevation are particularly advantageous for detecting the presence of a person in low-lying areas such as ditches, culverts, and gullies.

There is also shown in FIG. 5 part of a leveling system having leveling assemblies, designated generally as B, for leveling the vehicle V. In this manner a stable platform 30a is provided for the detection device 28 and pan/tilt device 30. This is particularly true in regards to stabilizing against wind and wind gusts. As long as mast is vertical within a described range of degrees, the camera 28 will survey the area without vibrations or other transitory disturbances as would effect the image transmitted and displayed on monitor 27. For optimum optics, the mast should be kept within one degree of true vertical.

Figure 6:
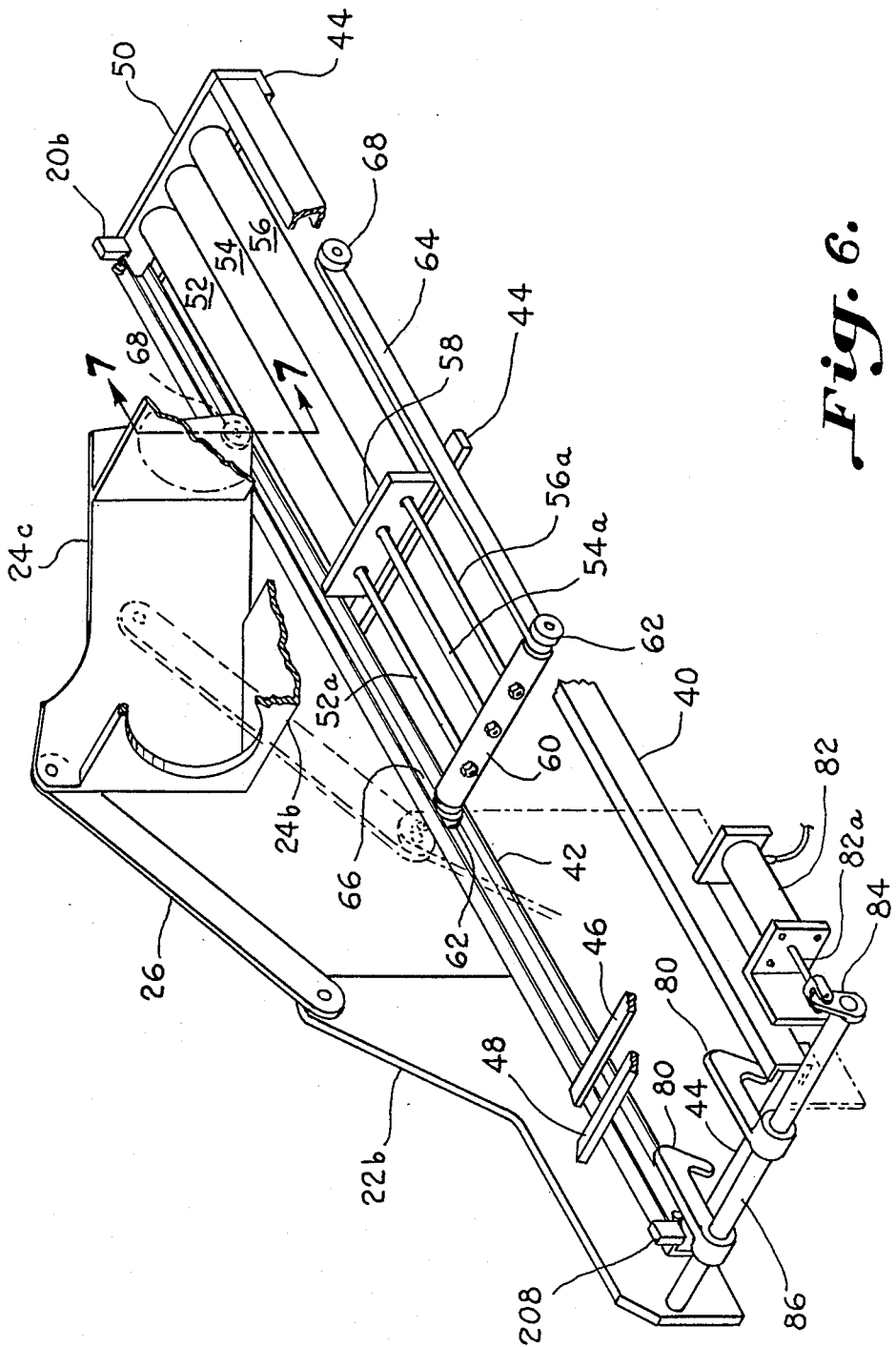
FIG. 6 is a perspective view with parts broken away of a rapid erection/retraction assembly constructed according to the invention.

Referring now to FIG. 6, the details of the rapid erection assembly A will now be described. There are a pair of U-shaped channel tracks 40 and 42 which are spaced apart by means of plates 44 affixed to the bottom of the vehicle floor and to the channels by any suitable means, such as welding. A support mechanism 22 comprises two parallel side plates 22a and 22b affixed to the outside of channels 40 and 42 respectively by any suitable means such a welding. Support mechanism 22 includes a pair of transverse support bars 46 and 48. Support bar 46 extends horizontal between channels 40 and 42 and support bar 48 is inclined at approximately forty-five degrees. The support bars 46 and 48 provide a cradle to support the pan/tilt device 30 when in a stowed configuration.

There is a front plate 50 affixed between track channels 40 and 42. Ram drive means is provided by three air cylinders 52, 54 and 56 having one end affixed to front plate 50. The other ends of the cylinders are affixed to a cylinder block 58 affixed between the track channels 40 and 42 by any suitable means. Respective piston rods 52a, 54a and 56a extend through the cylinder block 58 and are connected to a transverse cylindrical lockbar 60. There are a pair of rear roller bearings 62 affixed to ends of the lockbar 60. The roller bearings 62 include shafts affixed to lockbar 60 and there are a pair of parallel drawbars 64 and 66 also affixed to the shafts of the roller bearings defining a draw frame means. There are a pair of front roller bearings 68 which are affixed to shafts which extend through the front of drawbars 64 and 66. Actuation of the ram air cylinders causes the frame means, defined by the lockbar 60, drawbars 64 and 66, and carriage mechanism 24, to slide longitudinally along the track mechanism 20 defined by the channels 40 and 42.

Carriage mechanism 24 includes a pair of side plates 24c and 24d which are affixed to the front roller bearings 68. Plate 24b extends between the carriage side plates 24c and 24d. The bottom mast support plate 24a extends between the sides.

Figure 7:
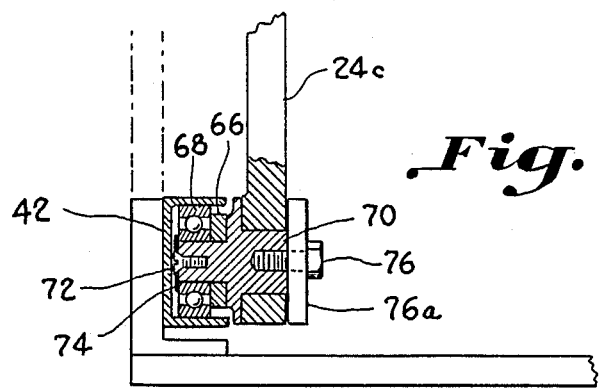
FIG. 7 is a sectional view taken along line 7—7 of FIG. 6.

Referring now to FIG. 7, connection of the side carriage plates 24c and 24d will now be described in more detail. There is a trunion 70 about which roller bearing 68 rotates. There is a countersunk screw 72 which affixes the roller bearing to the trunion by means of a special-fit washer 74. As can be seen, drawbar 66 is sandwiched between trunion 70 and roller bearing 68. Carriage side 24c is affixed to trunion 70. There is a bolt 76 threadably received in the trunion 70 which secures the carriage side and trunion together by means of washer 76a. The carriage side 24c and trunion 70 rotate together relative to drawbar 66 which slides in the channel track with roller bearing 68.

A ram lock for locking the lockbar 60 when mast 12 is fully erect is shown in FIG. 6. The lockbar 60, together with drawbars 64 and 66 and carriage mechanism 24, slides to the rear of track mechanism 20 when mast 12 is fully erect. In this position, lockbar 60 will abut a pair of locking hooks 80 which will be pushed up allowing their hook portion to latch over the lockbar 60. This ensures that the mast will stay fully erect. When it is desired to retract the mast, an air cylinder 82 will be actuated which will rotate lock members 80 counterclockwise to release the lockbar 60. For this purpose, piston rod 82a is connected to a crank arm 84 affixed to rod 86 to which the lock members 80 are affixed. The piston rod will push lever 84 to rotate the lock members 80 counterclockwise releasing lockbar 60. There is a microswitch 208 which is actuated when engaged by lockbar 60 in the locked position. Similarly, there is a front microswitch 206 actuated in response to carriage mechanism 24 arriving at the front of a track mechanism 20 when the mast is stowed.

Figure 8:
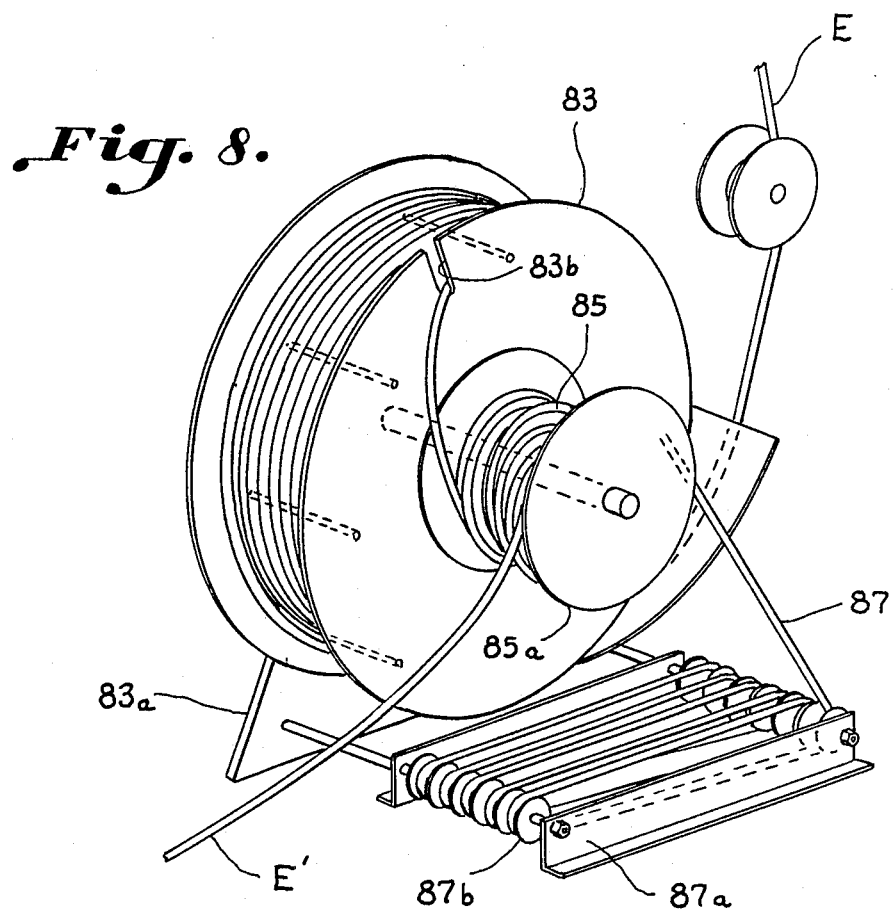
FIG. 8 is a perspective view of a cable retraction mechanism for a rapid erection/retraction assembly according to the invention.

FIG. 8 illustrates a cable retraction mechanism facilitating extension and retraction of an electrical transmission cable E which is routed along mast 12 and connects camera 28 and monitor 27. There is a cable reel 83 rotatably mounted on a plate 83a affixed to the vehicle floor. Cable E is wound on reel 83 and has an inner end which exits the reel at a slot 83b where a few auxiliary windings 85 are formed upon an auxiliary reel 85a which act like a clock spring during extension and retraction of cable E. From the auxiliary windings, a remote end E' of the cable is routed to monitor 27. There is a tension means for retracting reels 83 and 85a in the form of an elastic cord 87 wound upon a pulley block 87a. One end of cord 87 is fixed to auxiliary reel 85a. Pulley block 87a is in the form of a number of pulleys 87b around which cord 87 is wrapped in a taut but relatively unstretched state.

Upon extension of mast 12 and cable E, reel 83 will rotate counterclockwise and cord 87 will be stretched under considerable tension. Auxiliary windings 85 will also become more taut about auxiliary reel 85a to facilitate cable extension without need of a slip ring electrical contact structure. During retraction, cord 87 will wind reel 83 clockwise to retract cable E. Auxiliary windings 85 will loosen about auxiliary reel 85a.

Referring now to main door 14, it can be seen in FIGS. 9 and 10 that there is a door opening mechanism designated generally as 90 for opening the main door. Door opening assembly 90 includes a pair of off-center hinges 92 which are pivoted at 92a to a cylinder frame 94 affixed to the inside roof of the vehicle. There is a bracket 96 at the rear of frame 94 which affixes an air cylinder 98. The piston rod 98a is affixed to a pivot 100 which is carried by each hinge 92. Actuation of piston rod 98 to the left in FIG. 10 will pivot the hinge 92 upwards and open door 14. There is a pair of return spring 102 which will return the door to a closed position when air is removed from the cylinder 98.

There is a door latching mechanism designated generally at 104 for locking the main door for security and weatherproofing of the door closure. Latching mechanism 104 includes a pair of spaced locking cams 106 affixed to a rod 108. There is a sear 110 which locks a cam 111 to prevent opening of the door. There is an air cylinder 112 having a piston rod cam 112a which lifts sear 110 up so that the door may be opened. Simultaneously, the piston rod cam pushes cam lock 111 counterclockwise to rotate the locking cams 106 upwards so that the air cylinders 98 of the opening assembly may raise the door up. A microswitch 204 is actuated to signal that the door is up.

Main door 14 is closed when mast 12 is erect and extended by deactuation of air cylinders 98 and force of closure springs 102. Door rods 103 engages in cam locks 106 which are pivoted downwardly, whereupon sear 110 falls in behind cam 111 to positively lock the main door.

Displacement door 16 is lifted manually by erection of mast 12 as roller 32 is engaged by the mast. There is a seal and mast guide 114 which seals the vehicle interior with displacement door 14 up.

Figure 14:
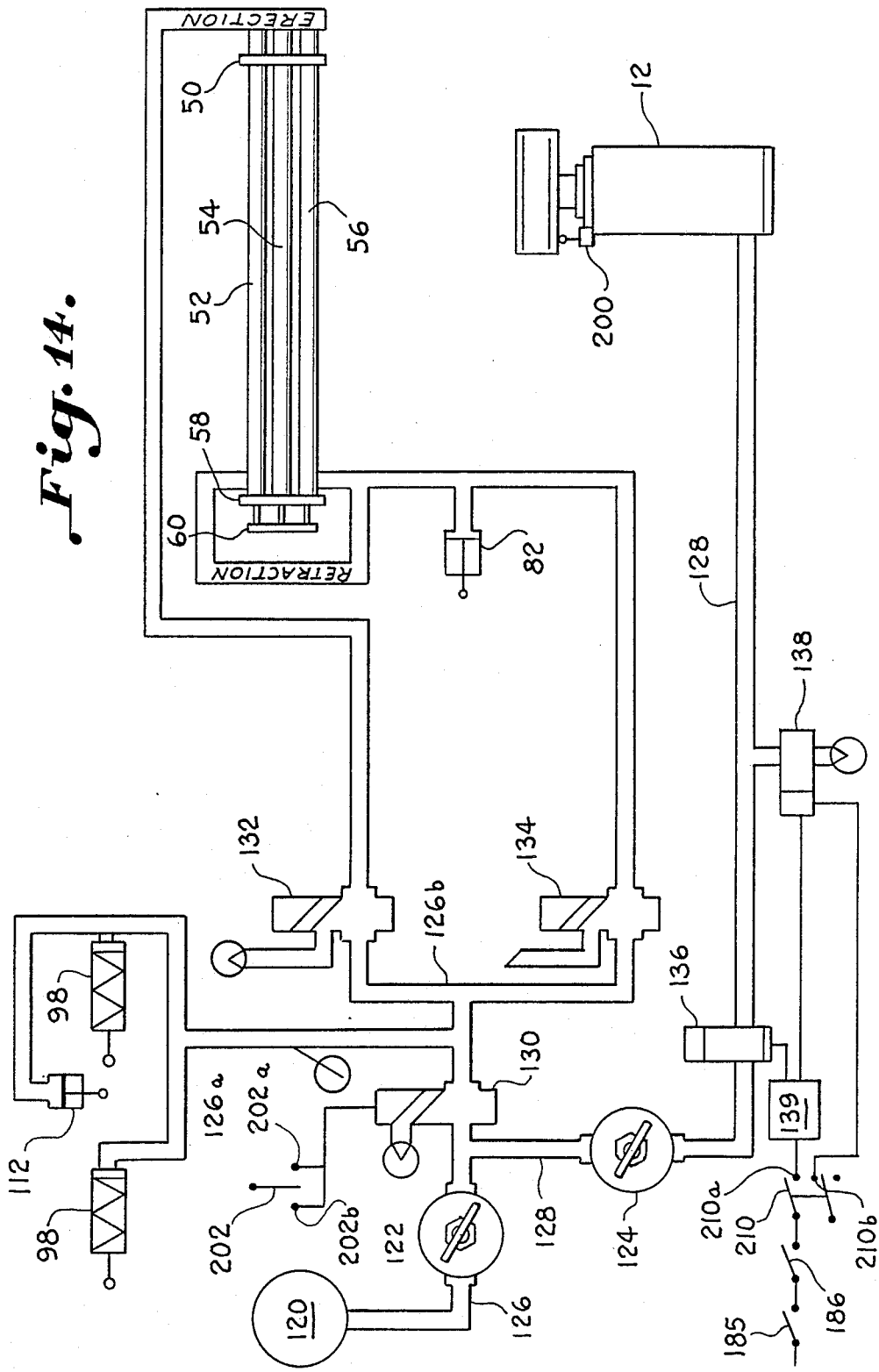
FIG. 14 is a pneumatic circuit diagram for erecting and retracting a rapid deployment surveillance system in accordance with the present invention and for extending a telescoping mast thereof.

Referring now to FIG. 14, an illustrative pneumatic circuit for operating the rapid erection/retraction assembly A will now be described. There is a source of compressed air 120. There is a high pressure regulator 122 and a low pressure regulator 124 connected in lines 126 and 128. There is a first master air solenoid valve 130 connected in line 126. Line 126 branches into a line 126a and line 126b. Line 126a goes to door opening cylinders 98 and to door release cylinder 112 for opening main door 14. In branch line 126b, there is a second air solenoid 132 which opens to deliver air to cylinders 52 through 56 for erecting mast 12. There is a third air solenoid valve 134 which opens to allow air to actuate the air cylinder 82 for ram lock release of lockbar 60 and retraction of mast 12. Retraction is accomplished by admitting air to cylinders 52 and 56 only. In this manner, air cylinder 54 is vented and acts as an air brake so that the mast is retracted slowly. In operation, air solenoid valves 130, 132 and 134 are normally closed. When the air solenoids are closed, the work side of the air lines are vented to ambient.

Limit switch 208 detects the position of bar 60 in its rear position. Limit switch 206 detects the most forward movement of carriage 24 to the front position. When mast 12 is erect, rear limit 208 switch is actuated to signal closing of the air solenoid 130 and 132. Lockbar 60 is latched by the ram lock 80 to maintain mast 12 erect. When mast 12 is stowed, front limit switch 206 is hit to signal closure of solenoids 130 and 134. Air is allowed to be bled back through air solenoid 132 from air cylinder 54 to act as an air brake during retraction.

There is fourth air solenoid valve 136 which is normally closed. Air solenoid valve 136 is open to allow air to be admitted through line 128 to extend the mast 12 after erection. When mast 12 is retracted, there is a fifth air solenoid valve 138 which is open to allow the air to be dumped for retraction of the telescoping mast. Microswitch 200 detects the retracted condition of mast 12 and signals closure of mast retraction solenoid 136 only after mast 12 is fully retracted.

Figure 12:
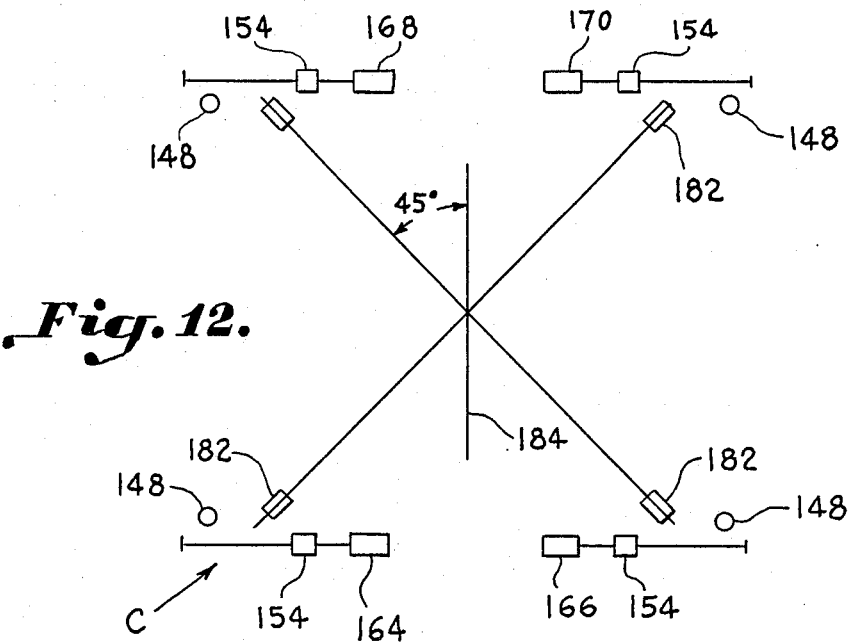
FIG. 12 is a schematic illustration of an automatic leveling system for leveling a vehicle according to the invention.
Figure 11:
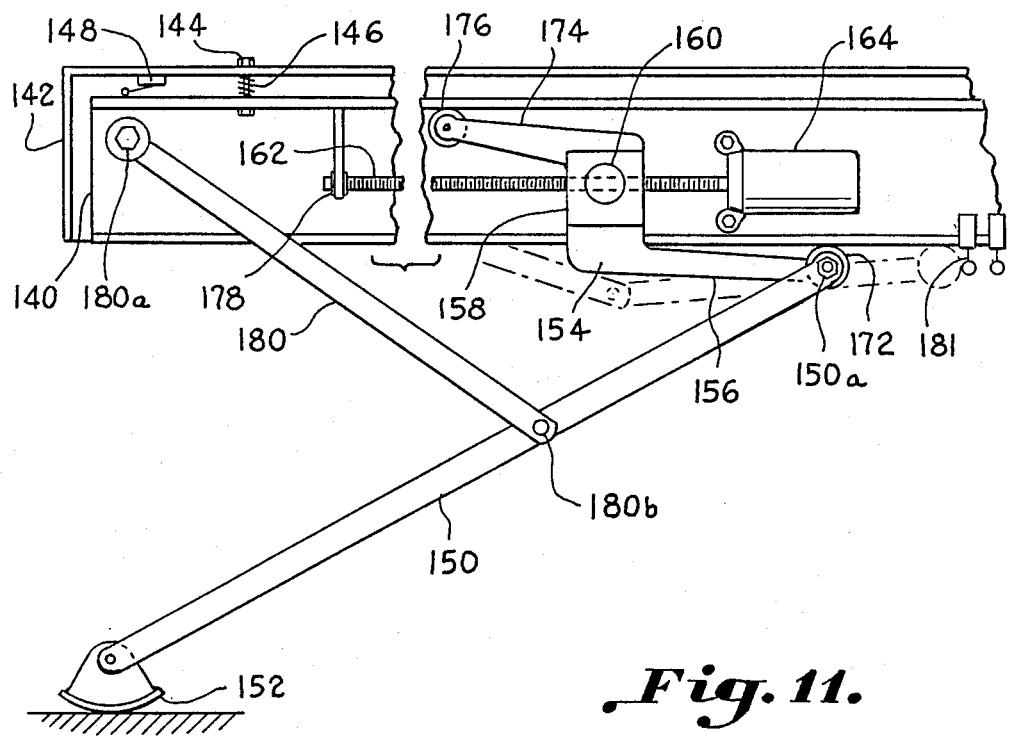
FIG. 11 is a partial cut-away elevation of a leveling system for a vehicle according to the invention at one corner thereof.

As can best be seen in FIGS. 11 and 12, a leveling system is provided for automatically maintaining the vehicle in a level configuration. This leveling system is provided to maintain mast 12 within one degree of true vertical when fully extended, as can best be seen in FIG. 5. This provides for a stable platform for the infrared camera or other detection device 28. If mast 12 is more than five degrees off vertical, the telescoping legs may freeze and not properly telescope or retract. Further, it has been found that mast 12 when fully extended is susceptible to damage from high or gusty winds. If fully extended mast 12 is more than one degree off center, these wind conditions may cause shearing of the mast. If the platform for the detection device becomes unstable, then the image received on monitor 27 may become distorted sufficiently that the surveillance operation is ineffective.

Referring now in more detail to drawing 11, the leveling system includes an identical leveling assembly B mounted to the front and rear corners of vehicle V. Since the leveling assembly B is essentially the same, only the leveling assembly at the left rear corner of the vehicle will be described. There is an inverted U-channel 140 which is bolted to an L-shaped flange 142.

Flange 142 is affixed to the bumper supports of the vehicle. U-shaped channel 140 is mounted to flange 142 by means of bolts 144. There is a spring 146 mounted between channel 140 and flange 142. There is a conventional pressure switch at 148 which senses the pressure of channel 140 upwards against spring 146. This pressure is caused by the pressure exerted through a jack means which includes a jack leg 150 against the ground. Leg 150 includes a pivoting foot 152 which engages the ground. The remote end of jack leg 150 is pivotally attached at 150a to a carriage 154 which slides in the U-shaped channel 140. Carriage 154 includes a pair of fork side brackets 156 affixed to a slider 158. Affixed between opposing sides of slider 158 is a block 160 which is centrally threaded and receives a screw rod 162 which is the shaft of a drive motor 164 which provides a drive means for the jack. There is a similar drive motor 166, 168, and 170 for leveling each corner of the vehicle (FIG. 12). While only the left rear corner is illustrated in FIG. 11, it is to be understood that the remaining corners of the vehicle are provided with an identical jacking system.

Returning now to the detailed description of the leveling assembly by reference to FIG. 11, it can be seen that by driving motor 164 either in a forward or reverse direction, the slider 158 will move in channel 140. Brackets 156 carry rollers 172 which engage the underneath edge of channel 140 to bear against there and roll. The shaft about which the rollers rotate also provides a pivot for jack leg 150. Carriage 154 further includes an additional interior fork bracket 174 having two legs which are provided with rollers 176 that engage the underneath part of the top of channel 140 and provide a roller bearing thereagainst. By the means of rollers 172 and 176, carriage 154 moves in opposing directions in the channel 140 by means of the driving movement of slider 158. The remote end of screw rod 162 is affixed at 178 in a journal. There is a linkage arm 180 pivoted to U-channel 140 at 180a and also pivotally attached to jack leg 150 at 180b.

Referring to FIG. 12, there is a level sensor means in the form of a mercury switch 182 arranged on diagonals which intersect the longitudinal axis 184 of the vehicle at forty-five degrees.

Figure 13:
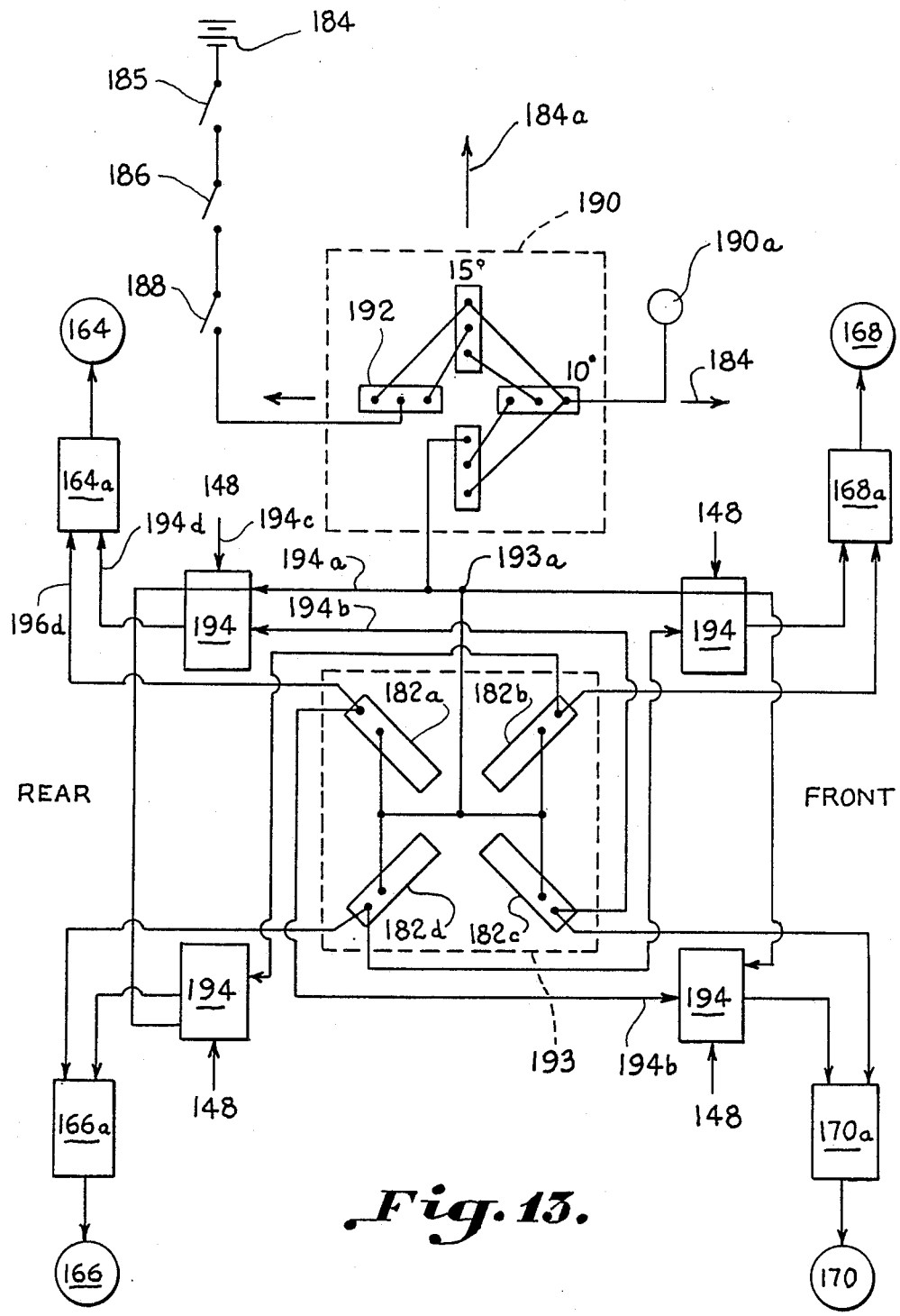
FIG. 13 is a schematic electrical circuit diagram for an automatic leveling system constructed in accordance with the invention.

Any suitable control arrangement may be provided for controlling the leveling of each corner of the vehicle upon receiving the various signals from the pressure switches 148 and the mercury switches 182. From these signals, the electric motors 164 through 170 are controlled to level the vehicle. In FIG. 13, one suitable controller arrangement is schematically illustrated. The mercury switches 182 are designated as the four individual mercury switches 182a, 182b, 182c and 182d. There is a power source 184 connected to a master switch 185 which is connected to a jack switch 186. There is an emergency brake microswitch 188 connected in series with switches 185, 186. When the emergency brake is on, microswitch 186 will be closed. Jack power switch 188 is closed to activate the leveling systems with master switch 185 on. Switch 188 is connected to a leveling limit platform 190 which consists of four three-pole mercury switches 192 arranged along the longitudinal and lateral axes 184 and 184a of the vehicle. Level limit platform 190 checks to see if the vehicle is within prescribed capacity limits in which the vehicle can be leveled. For example, if the longitudinal orientation of the vehicle is more than ten degrees off level, the leveling system cannot level the vehicle. If the vehicle is more than fifteen degrees off level in a lateral direction it cannot be leveled. Thus the logic of the mercury switches 192 so arranged must be satisfied before power will be output from circuit 190 to a primary leveling circuit 193 defined by the two-pole mercury switches 182. This power will be transmitted at 193a. Preferably, level limit platform 190 and primary circuit 193 are stacked upon each other so as to be in the same plane and level relative to the vehicle mount by which they are attached Power from the level limit platform circuit 190 is delivered to the primary leveling circuit 193 as described above, and also through four pressure disable circuits 194. The pressure disable circuits for each corner disable the motor drive circuits 164a, 166a, 168a, and 170a through two conditions. First is when a prescribed pressure is reached, such as 700 pounds, to ensure that each jack leg firmly engages the ground. Second, the pressure disable circuit is used to disable a respective motor drive circuit of a high corner when the opposing diagonal corner of the vehicle is low and is being raised to level. In this situation, it is desired not to drive the high corner, but only to raise the low corner so that the corners will not be reacting to each other during leveling. Should the high corner become low, then the opposing diagonal corner would be disabled and the resulting low corner would be brought back up to level until each corner and the vehicle are level. The pressure disable circuits may be any conventional circuit such as a double pole relay circuit.

Since the respective inputs and outputs for each pressure disable circuits are identical, only one such circuit will be described in detail. Each pressure disable circuit includes a power input at 194a, a mercury switch input signal at 194b from the opposing diagonal mercury switch, and a pressure signal at 194c from pressure switch 148. There is an output disable signal at 194d to a respective drive motor control means in the form of motor driver control circuits 164a, 166a, 168a, or 170a.

The pressure disabled circuits 194 also provide another advantage. As is often the case in utilizing mercury switches, there occurs a hysteresis effect. For example, if the left, rear corner is being raised via motor 164, the motor driver circuit 170a is disabled. As the left lower corner reaches level, mercury switch 182a opens to disengage motor driver circuit 164a. However, since motor driver circuit 170a has been disabled by input 194b coming from mercury switch 182a, no actuation of motor 170 is had if the mercury switch 182c is closed incidentally as this would create a hysteresis effect. The hysteresis effect would result in the corners going back and forth in a see-saw manner.

Pressure of 700 pounds has been found to balance and prevent the hysteresis effect by balancing closure of the high side circuits becoming level. Lower and higher pressures have been found to be ineffective for the particular vehicle weight.

Motor driver circuits 164a through 170a may be any conventional motor driver circuit such as a Type 586 sealed contactor circuit manufactured by Stancor and available from Newark Electronics of Tuson, Ariz. It will be noted that there are two parallel circuits for input to each motor driver circuit. For example, referring again to the left rear corner driver circuit 164a, there is input 194d from pressure disable circuit and there is an input 196d coming from the output of mercury switch 182a. It is noted that there is a second output 194b from each mercury switch, for example, there is a second output from mercury switch 182a which goes to disable circuit 194 of the right front corner disabling motor driver circuit 170a.

In operation, if the left rear corner of the vehicle is low, mercury switch 182a will be closed and there will be an input at 196d. Jack leg 150 will be lowered until it engages the ground and begins to lift the left rear corner. When the preset pressure of 700 pounds is reached, there will be an input at 194d from the pressure disable circuit due to pressure switch 148 being activated. However, as long as mercury switch 182a is closed the input signal 196d will override the input signal 194d. This will continue until mercury switch 182a is open. If the remaining three corners of the vehicle should be level, then the motor driver circuit for the jack legs 150 of the three respective corners will be actuated until the preset pressure of 700 pounds is reached, at which time the input signal 194d from the pressure disable circuits 194 will disengage the remaining three corners. This assures that level, will have their jack legs firmly engaged in the ground.

While the operation of the rapid erection assembly A, extension of telescoping mast 12, and a leveling system may be done manually, the operation may be automatic. Any suitable control system may be utilized to control the automatic operation of the aforementioned systems which have been described. Such a control system may be provided by conventional microprocessors or relay circuits as would be well within the purview of one skilled in the automatic programming art having been taught the present invention. Accordingly, the operation of the invention will now be set forth in relation to FIGS. 15 through 17 which illustrate in flow diagram form an embodiment of the operation of the rapid deployment surveillance system.

Figure 15:
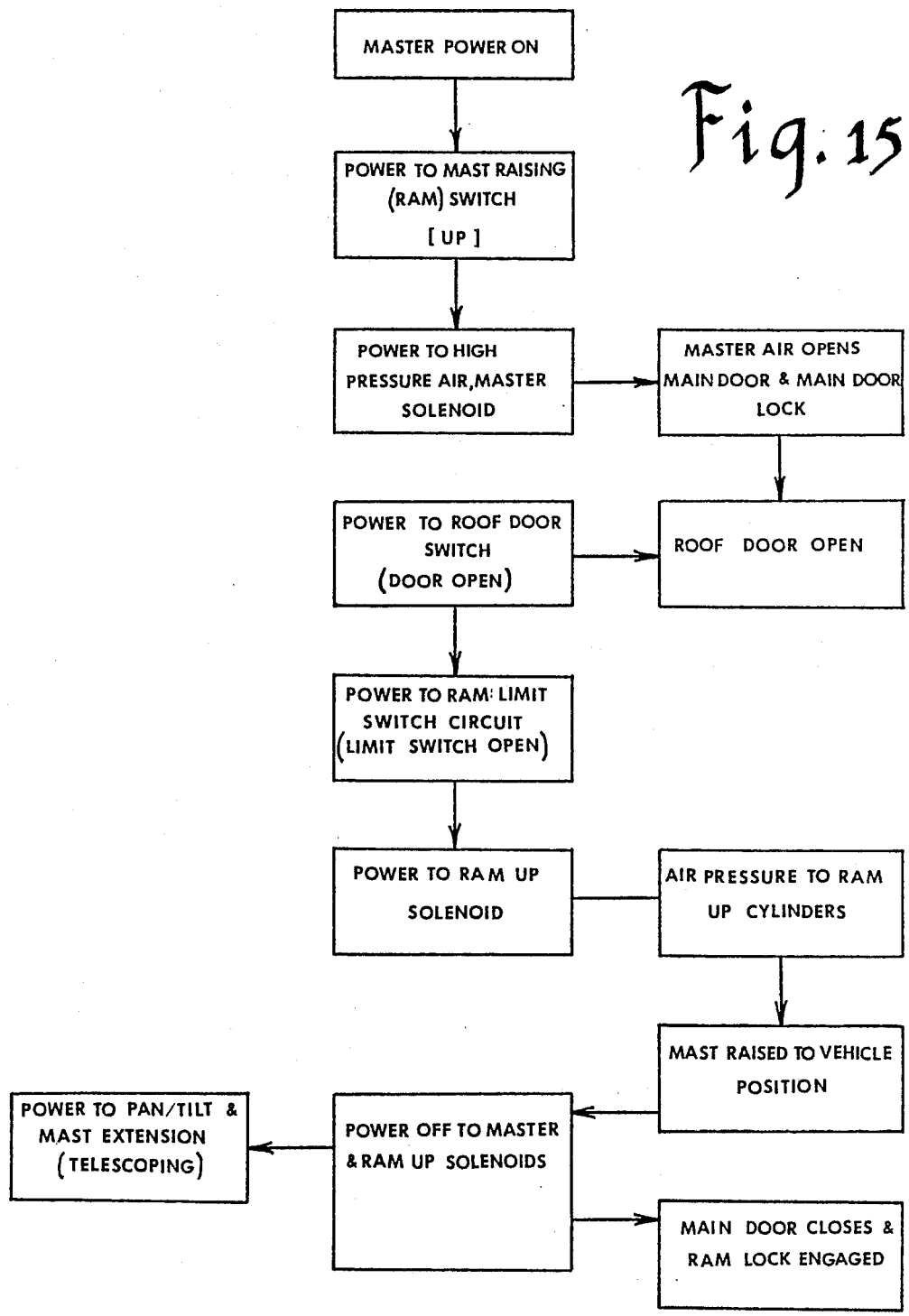
FIG. 15 is a logic diagram for erecting a rapid deployment surveillance system according to the invention.

Referring now to FIG. 15, rapid erection of mast 12 will now be described. Upon setting up the surveillance vehicle at a surveillance sight, master switch 185 is first closed connecting the system to power source 184. Next, a master mast raising switch (SPDT, single pole double throw) 202 is moved to an up position 202a to actuate master solenoid 130. Power is made available to up solenoid 132. The master air passes through line 126a to open main cylinders 98 and release of door lock cylinder 112. Main door 14 now opens as detected by roof limit switch (SPDT) 204 whereupon front and rear ram limit switches (SPDT) 206 and 208, respectively, are power activated. Air solenoid valve 132 is actuated in response to the opening of door 14 as signaled by switch 204. Air pressure is emitted to the ram cylinders 52, 54, and 56 through open solenoid 132. Mast 12 is quickly raised to its erect vertical position by movement of carriage mechanism 24. Upon the mast being erected, lockbar 60 will contact switch 208 to signal closure of master solenoid 130 and mast-up solenoid 132. Additionally at this time, power will be delivered to the pan/tilt mechanism 30 and mast extension system. With master air solenoid 130 off, air through line 126a will be discontinued whereupon the main door air cylinders 98 will be deactuated. Main door 14 will be returned to a closed position by spring action whereupon door lock 106 will be engaged.

Figure 17:
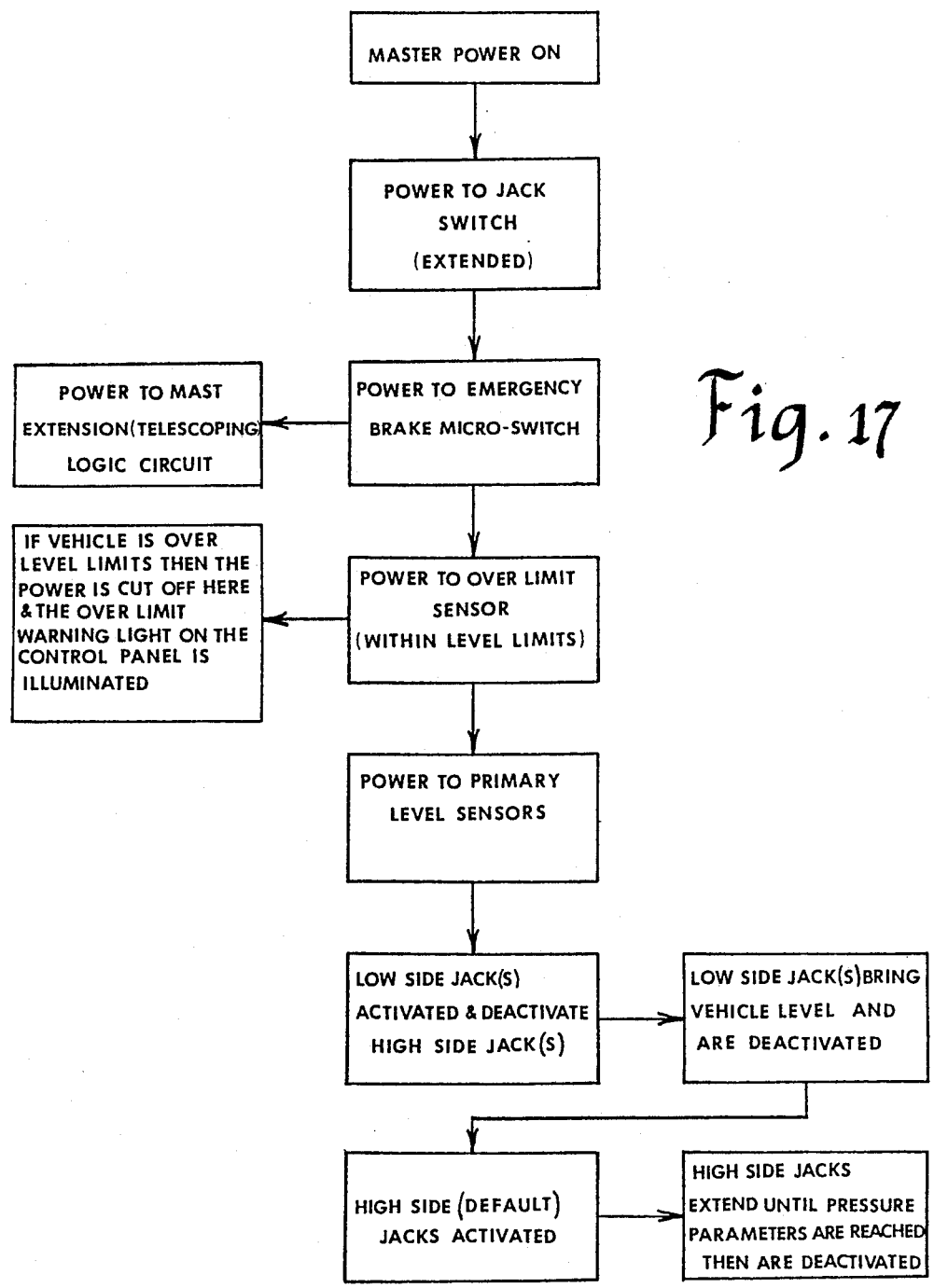
FIGS. 17 and 17A are schematic logic diagrams for the operation of an automatic leveling system according to the invention.
Figure 17A:
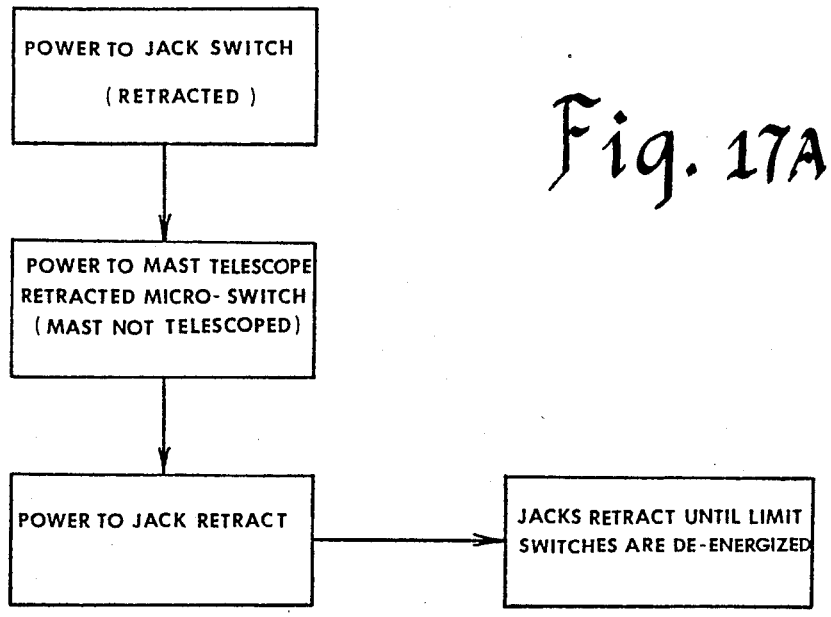

Referring now to FIG. 17, the sequencing of the leveling system will now be described. With master switch 185, jack switch 186, and emergency brake switch 188 closed, power will be delivered to a failsafe mast extension logic circuit 139, and to level limit platform circuit 190. If the vehicle should already be within one degree of level, mast extension solenoid 136 will be actuated without engagement of the leveling system. Should the vehicle be unlevel, the level limit platform circuit 190 detects whether the condition of the vehicle is within the capacity of the leveling system. If the vehicle is outside of the leveling capacity of the system, then power is cut off and an overlimit warning light 190a is illuminated.

If the vehicle is within the leveling capacity of the system, then power is supplied by circuit 190 to the primary leveling sensor circuit 193. The jack mechanisms on the low side corners of the vehicle are activated by the corresponding motor driver circuit 164a through 170a. The low side jacks bring the vehicle into a level condition and are deactivated. The high side jacks which have been previously deactivated by the pressure disabling circuit 194 are now activated until 700 pounds of pressure is reached on the foot of the jacks. The high side jacks are then deactivated assuming that the high side jacks are level at the time the prescribed pressure is reached.

Figure 16:
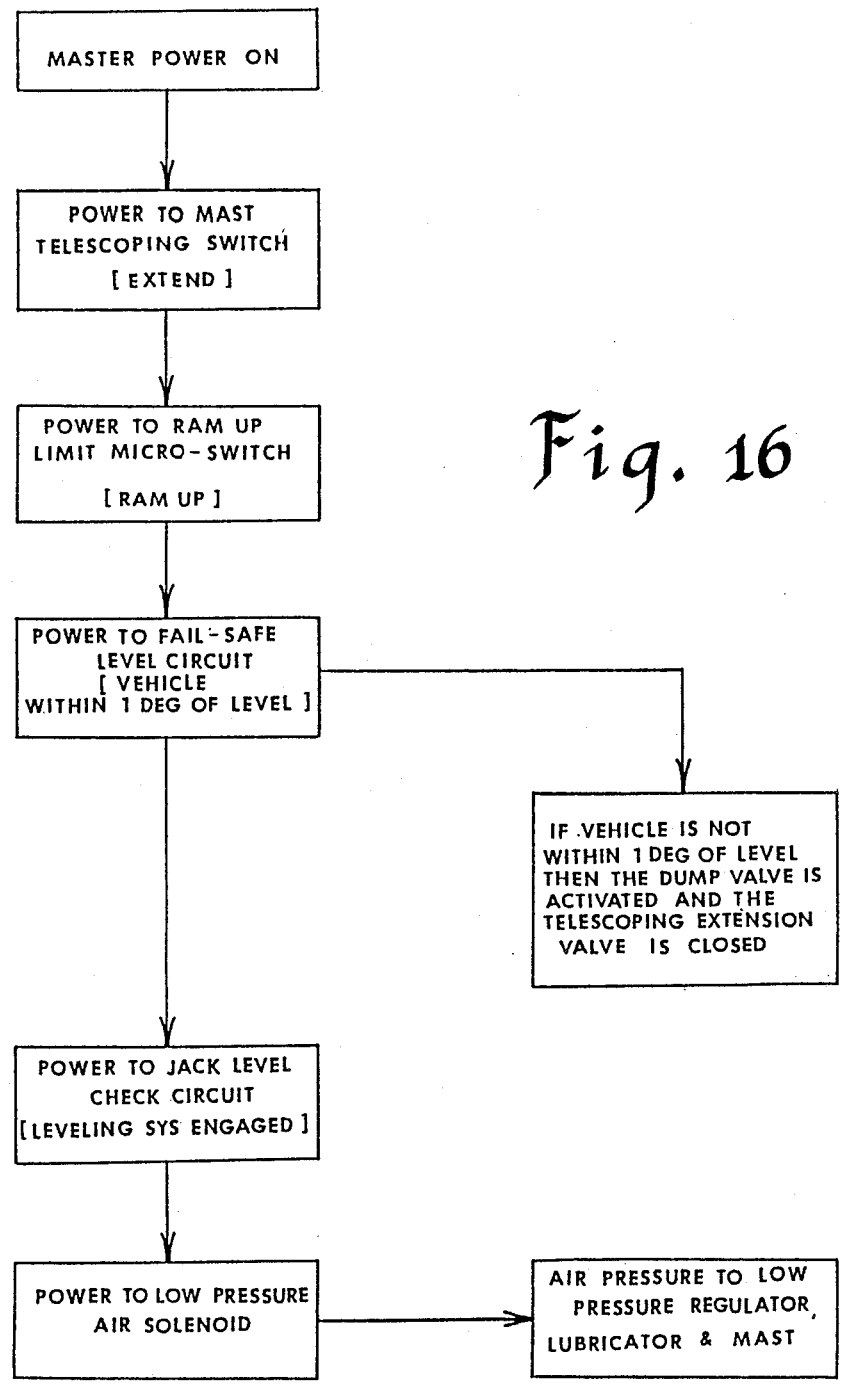
FIGS. 16 and 16A are schematic logic diagrams for extending and lowering a telescoping mast of a rapid deployment surveillance system according to the invention.
Figure 16A:
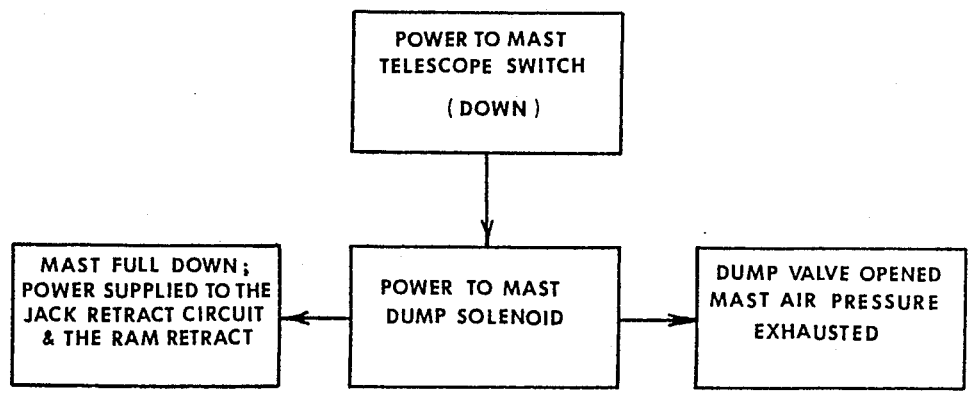

With the mast erect and the vehicle level, the mast extension system will be engaged in a sequence described by reference to FIGS. 16 and 16A. Master switch 185 has previously been turned on. Next, master mast telescoping switch (SPDT-C-0, single pole double throw) 210 is moved to an up position 210a (FIG. 14). Failsafe circuit 139 is activated to assure that the vehicle has been leveled within one degree of level before actuating mast solenoid 136. Again, if the vehicle is not within one degree of level, dump valve 138 is activated and the telescoping extension valve 136 is closed by the two outputs of circuit 139. Failsafe circuit 139 may be any conventional level detection surface such as the arrangement of mercury switches shown in FIG. 13 coupled with a relay. The leveling system remains engaged to monitor the level conditions of the vehicle during use. With the vehicle level and the leveling system engaged, air solenoid 136 is activated whereby air is delivered through the low pressure regulator 124 to mast 112. With the mast raised, the mast extension switch 210 is placed in neutral whereupon the solenoid valve 136 and dump valve 138 are closed. In this manner, the height of the mast is maintained by static pressure corresponding to the point at which the telescope switch is placed in neutral. Although switch 210 is opened to failsafe circuit 139, it remains activated through the leveling system to dump air and retract the mast should the vehicle become unlevel.

If it is desired to retract the surveillance system, mast telescope switch 210 is moved to the down position 210b whereupon dump solenoid 138 is energized to bleed off air and lower the mast slowly. When the mast is completely retracted (FIG. 14) limit switch 200 is actuated. This signals the leveling system for retraction of the jacks and the mast retraction assembly A for retraction of mast 12 to its stowed position of FIG. 2.

The jacks 150 retract until limit switches 181 are hit whereupon the leveling system is cut off.

Figure 15A:
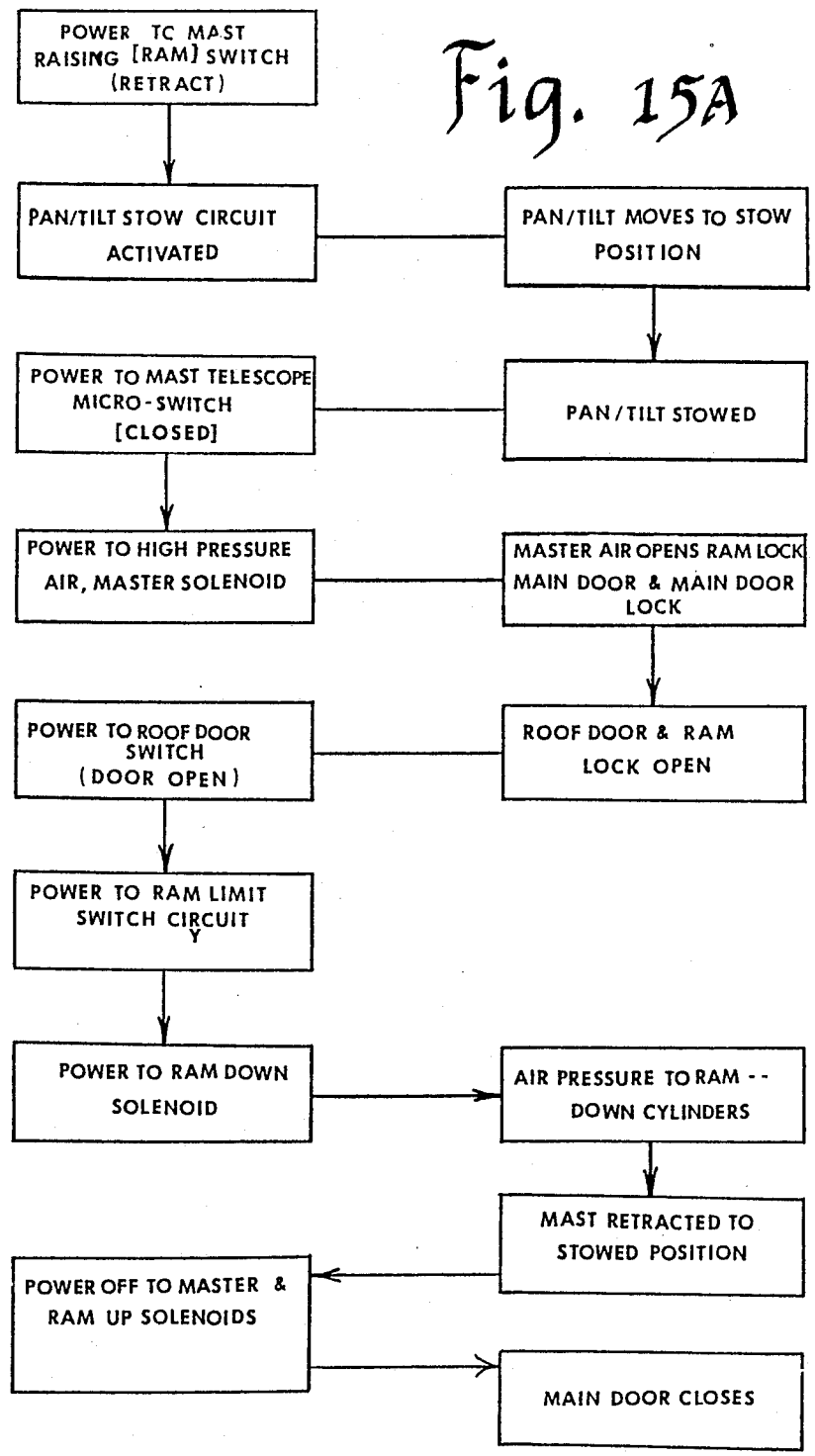
FIG. 15A is a schematic logic diagram for retracting a rapid deployment system according to the invention.

Referring to FIG. 15A, the retraction of the nested mast to its stowed concealed configuration will be described. Switch 202 is moved to a retract position 202b whereupon pan/tilt device 30 is activated to tilt the camera ninety degrees to its stowage position 28a. Power to retraction solenoid 134 is also made available. Mast microswitch (SPDT) 200 signals opening of master air solenoid 130. Solenoid 132 remains closed but is in a vented position. Air is delivered through lines 126a to the door opening solenoids 98 and door release solenoid 112 to open door 14. Door open switch 204 signals actuation of retraction solenoid 134. Air is also delivered through solenoid 134 to ram lock release air cylinder 82 which releases the rear lockbar 60 of the draw frame which moves carriage mechanism 24 and retracts mast 12. Retraction air is supplied to the ends of cylinders 52 and 56 only which are double acting cylinders. Cylinder 54 is vented through solenoid 132 and acts as an air brake in this instance. Air is admitted to ram cylinders 52 and 56 until the front ram limit switch 206 is hit by carriage mechanism 24. This indicates that the mast is retracted to its stowed position whereupon master solenoid 130 and mast retraction solenoid 134 are deactuated. The main door closes after master solenoid 130 cuts off air supply to door opening air cylinders 98. The surveillance system is now fully stowed and concealed.

Thus, it can be seen that a highly advantageous surveillance system and vehicle can be had in accordance with the invention. The system may be completely concealed in a regular off-the-road vehicle and erected and fully extended in about three minutes for surveillance. The vehicle may be used in a mobile patrol mode with the mast erect but not yet extended in which case the surveillance camera is about three feet above roof level.

While a preferred embodiment of the invention has been described using specific terms, such description is for illustrative purposes only, and it is to be understood that changes and variations may be made without departing from the spirit or scope of the following claims.

What is claimed is:

1. A rapid deployment surveillance vehicle from which a detection device may be rapidly deployed from a stowed concealed position within a vehicle to an elevated vertical position for surveilling a detected event comprising:
    a mast on which said detection device is carried;
    a rapid erection/retraction system carried within said vehicle for deployment of said mast and detection device from said stowed, concealed position to an initial erect vertical position;
    a mast extension system for extending said detection device vertically to said elevated position elevated from said initial erect position considerably above said vehicle;
    a leveling system for leveling said vehicle during the time that said detection device is extended to said elevated position which includes:
        jack means carried adjacent each corner of said vehicle for engaging the ground and raising said vehicle,
        drive means for actuating said jack means,
        level sensor means for sensing a level condition of said vehicle and generating a level signal representative of said level condition, and
    control means for controlling said mast extension system and said leveling system in conjunction with each other, said control means controlling said drive means in response to said level sensor signal for simultaneously controlling said jack means ad leveling said corners and said vehicle continuously while said detection device is extended to said elevated position, and said level sensor means continuously sensing said level condition for generating said level sensor signal while surveilling said detected event,
    platform mounting means for mounting said detection device to a free end of said mast; and
    said control means of said leveling system controlling said jack drive to level said vehicle continuously during surveillance for maintaining said extended mast within a prescribed range of true vertical so that said detection device is stably carried by said mast in said elevated position providing a stable, enhanced image of the detected event on the display of a monitor continuously while surveilling said detected event.

2. The apparatus of claim 1 wherein said leveling system includes a pressure sensor for sensing the pressure of each said jack means against the ground individually and simultaneously; and said control means includes disablement circuit means for deactivating said drive means of one jack means in response to said pressure sensor sensing a prescribed pressure level at a diagonal jack means and generating a corresponding pressure signal.

3. The apparatus of claim 2 wherein said level sensor signal overrides said pressure signal to activate said drive means as long as said level signal indicates a below level condition.

4. The apparatus of claim 2 wherein said prescribed pressure is seven hundred pounds.

5. The apparatus of claim 1 wherein said mast extension system includes an extendable telescoping mast and said leveling system includes a safety level sensing means for detecting level condition of said vehicle and for extending said mast only if prescribed level condition exists.

6. The apparatus of claim 5 wherein said prescribed level condition is within one degree of level.

7. The apparatus of claim 1 wherein said leveling system includes a level limit means for measuring the level condition of said vehicle and determining if said leveling system has the capacity to level the conditions of said vehicle.

8. The apparatus of claim 1 including:
    an electrical transmission cable connecting said detection device and said monitor; and
    said mast extension system including a cable extension mechanism facilitating an extension and retraction of said transmission cable as said mast is extended and retracted.

9. The apparatus of claim 8 wherein said cable extension mechanism comprises a reel on which said cable is wound in said retracted position; and
    tension means placing said reel under tension so as to automatically retract said cable as said mast is retracted.

10. The apparatus of claim 9 comprising an auxiliary reel carried for rotation with said cable reel which includes a plurality of cable windings which remain fixed, said auxiliary cable windings having one end which is connected to said monitor at a remote location, and said auxiliary cable windings being loose upon said auxiliary reel when said cable is retracted and becoming taut on said reel as said cable is extended.

11. The apparatus of claim 1 including:
    said erection-retraction assembly including a movable carriage mechanism, said telescoping mast including a base section affixed to said movable carriage mechanism; and
    said carriage mechanism being carried within said vehicle interior for translational and rotational movement in a manner that said base section of said telescoping mast is moved from a horizontal position to an erect vertical position during translation and rotation of said carriage mechanism.

12. The apparatus of claim 11 including a track mechanism carried longitudinally on a floor of said vehicle upon which said carriage mechanism moves and is guided in said translational and rotational motions.

13. The apparatus of claim 11 wherein said vehicle includes:
   a longitudinal roof opening through which said telescoping mast is moved by said carriage mechanism from said horizontal to said erect vertical position.

14. The apparatus of claim 13 wherein said roof opening includes a main door extending a substantial length of said roof opening;
   means for automatically opening said main door upon movement of said carriage mechanism;
   a displacement door pivotally carried by said vehicle over a remaining portion of said roof opening which is opened and displaced upon vertical extension of said mast.

15. The apparatus of claim 14 wherein said displacement door is opened by engagement with said erect telescoping mast.

16. The apparatus of claim 1 wherein said platform mounting means comprises a platform tilt mechanism which carries said detection device in a manner that said detection device may rotate in a horizontal plane and tilt about a pitch axis in a vertical plane facilitating a wide range of extended surveillance.

17. The apparatus of claim 16 wherein said platform mounting means tilts said detection devices to a storage position which is ninety degrees from horizontal during retraction of said mast to said stowed concealed position.

18. The apparatus of claim 1 including pressure sensor means for sensing the pressure of each of said jack means individually and simultaneously at each corner of said vehicle, and said control means controlling said drive means in response to each of said individual pressure signals and said level sensor signal for controlling said jack means in a manner that said jack means interact with one another continuously while said detection device is extended in said elevated position to compensate for any changes in the level condition of said jack means maintain said vehicle in said level condition continuously while surveilling said detected event.

19. A rapid deployment surveillance system for rapidly deploying a detection device from a vehicle for surveillance of an area comprising:
   an extendable telescoping mast having a plurality of telescoping sections;
   an erection-retraction assembly for rapidly erecting and retracting said telescoping mast which includes:
      a track mechanism extending longitudinally of said vehicle,
      a support mechanism for assisting in the support of said mast affixed to said track mechanism adjacent open end thereof,
      a carriage mechanism carried by said track mechanism for translational and rotational motion guided by said track mechanism,
      said telescoping mast having a base section affixed to said carriage mechanism,
      a support arm pivotally connected to said support mechanism and to said carriage mechanism, and
      ram means for moving said carriage mechanism longitudinally along said track mechanism in a manner that said carriage mechanism rotates to raise said telescoping mast from a horizontal position to an erect vertical position while undergoing translational and rotational motion,
   an extension system for extending said telescoping mast to an elevated vertical position at which a wide range of surveillance of said area may be had; and
   a monitor adapted for connection to said detection device for displaying a detected event at the location of said monitor remote from said detection device.

20. The apparatus of claim 19 wherein said carriage mechanism includes a pair of spaced parallel carriage plates carried by said track mechanism; said carriage plates being pivotally carried by said track mechanism for translational motion in said longitudinal direction of said vehicle and for rotational motion; base means carried intermediate said side plates to which said base section of said mast is affixed with said mast cradled within said carriage mechanism; and each of said carriage plates being pivotally attached to said support arm.

21. The apparatus of claim 20 wherein said track mechanism comprises a pair of parallel track sections; a draw frame slidably carried by said track sections; said carriage plates being pivotally attached to said draw frame; and said ram means comprises a plurality of fluid actuated cylinders connected to said draw frame for moving said draw frame in reciprocating motions on said track mechanism to erect and retract said telescoping mast.

22. The apparatus of claim 21 wherein said ram means comprises a plurality of fluid actuated cylinders which may be actuated in opposite directions; all of said fluid-actuated cylinders being actuated to erect said telescoping mast; and one of said fluid actuated cylinders being deactuated to act as an air brake during the retraction of said telescoping mast.

23. The apparatus of claim 19 wherein said erection-retraction assembly includes a cradle support for supporting said detection device when said telescoping mast is retracted to said stowed position.

24. The apparatus of claim 20 wherein said carriage plates rotate counterclockwise generally from a horizontal to a vertical position during the erection of said mast.

25. The apparatus of claim 21 including a ram lock for locking said draw frame when moved to said mast erect position by said ram means for locking said erected telescoping mast.

26. A rapid deployment surveillance vehicle comprising:
   a vehicle having an interior space defined by a cab;
   an extendable mast carried within said vehicle cab adapted for supporting a detection device adjacent a free end of said mast for detecting a desired event;
   a monitor carried remotely from said detection device for displaying an image of said detected event;
   a rapid erection-retraction assembly carried within said vehicle for rapidly erecting and retracting said extendable mast which includes:
      a track mechanism extending longitudinally of said vehicle,
      a fixed support mechanism affixed to said track mechanism adjacent one end thereof, a movable carriage mechanism carried by said track mechanism adjacent a remote end thereof, a support arm pivotally connected to said support mechanism and carriage mechanism, said extendable mast being affixed to said carriage mechanism, and ram means for moving said carriage mechanism along said track mechanism in a manner that translational and rotational motion is imparted to said carriage mechanism to raise said mast from a horizontal concealed position within said vehicle cab to a vertical erect position in which said extendable mast extends through a roof opening in a roof of said vehicle cab, an extension system for extending said extendable mast when fully erect;

a vehicle leveling system for leveling said vehicle in a manner that said extendable mast is extended in a generally true vertical configuration, said leveling system including;

jack means carried adjacent corners of said vehicle for engaging the ground and raising said vehicle corners, drive means for driving said jack means to raise said vehicle, level sensor means for sensing the condition of said vehicle with respect to level and generating a level signal representative of the level condition of said vehicle, control means for controlling said drive means in response to said level sensor means for leveling said corners and said vehicle, platform means for mounting said detection device on said extended mast; and said leveling system maintaining the level condition of said vehicle during surveillance in a manner that said extended mast is within a prescribed range of true vertical so that the detection device is stably mounted by said mast in said elevated position providing a stable enhanced image on the display of said monitor.

27. The apparatus of claim 26 wherein said roof opening of said vehicle cab comprises a door closure which opens for erection of said mast and closes after said extendable mast is extended to close the vehicle from outside elements.

28. A rapid deployment surveillance vehicle for rapidly deploying a detection device for surveilling a wide area for the detection of illegal immigration activities and the like comprising:

a vehicle having a generally unmodified outside appearance of a regular off-the-road passenger vehicle with an interior space defined by a vehicle cab which is modified for placement of a rapid erection and retraction assembly which rapidly deploys said detection device;

an extendable mast adapted for supporting said detection device at a remote end of said extendable mast;

said rapid erection and retraction assembly including means for moving said extendable mast from a stowed concealed position within said cab for said vehicle to a vertical erect position extending vertically above said cab of said vehicle;

said mast being carried by said rapid erection and retraction assembly and completely stowed and concealed entirely within the said vehicle cab in said stowed position;

said vehicle having the appearance of said regular off-the-road vehicle with said mast and detection device in said stowed concealed position;

a roof opening formed in a roof in said vehicle cab through which said erect extendable mast is vertically elevated to a surveillance position;

a monitor disposed at a remote location from said detection device within said vehicle cab;

means for moving said detection device in a number of degrees of freedom to effectively scan the entire area under surveillance;

said extendable mast being extendable to said elevated surveillance position well above the roof line of said vehicle cab to provide surveillance of an extended area;

said fast erection and retraction system including a carriage means by which said extendable mast is moved from said stowed retracted position in an arcuate motion through said roof opening of said cab to said erect vertical position and a main door for closing a first portion of said roof opening, means for opening said main door while said mast is moved to said erect position through said door opening and for closing said main door, and said roof opening including a second portion through which said mast extends in said erect position with said main door closed.

29. The apparatus of claim 28 wherein said extendable mast has a retracted length in said stowed concealed position which is greater than the height of said vehicle cab.

30. The apparatus of claim 29 wherein said extendable mast in said erect position extends above the roof of said vehicle at an initial extended position and may be extended to a number of intermediate vertical positions prior to being set at said elevated surveillance position.

31. The apparatus of claim 28 including:

means for automatically opening said main door upon movement of said carriage mechanism; and a displacement door pivotally carried by said vehicle over said second portion of said roof opening which is opened and displaced upon vertical extension of said mast.

* * * * *